United States Patent
Kida et al.

(10) Patent No.: US 11,507,241 B2
(45) Date of Patent: Nov. 22, 2022

(54) TOUCH PANEL, DISPLAY DEVICE, AND INPUT DEVICE HAVING SHIELDING FOR TOUCH SENSING ELECTRODES AND/OR PRESSURE SENSING ELECTRODES

(71) Applicant: SHARP KABUSHIKI KAISHA, Sakai (JP)

(72) Inventors: Kazutoshi Kida, Sakai (JP); Yasuhiro Sugita, Sakai (JP); Hiroshi Fukushima, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/471,067

(22) Filed: Sep. 9, 2021

(65) Prior Publication Data

US 2022/0100324 A1  Mar. 31, 2022

Related U.S. Application Data

(60) Provisional application No. 63/084,515, filed on Sep. 28, 2020.

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0416* (2013.01); *G06F 3/0445* (2019.05); *G06F 3/0446* (2019.05); *G06F 2203/04105* (2013.01); *G06F 2203/04107* (2013.01); *G06F 2203/04112* (2013.01)

(58) Field of Classification Search
CPC .... G06F 3/0448; G06F 3/0412; G06F 3/0416; G06F 3/0446; G06F 2203/04107; G06F 2203/04112
See application file for complete search history.

(56) References Cited

U.S. PATENT DOCUMENTS

| | | | | |
|---|---|---|---|---|
| 2011/0095990 | A1* | 4/2011 | Philipp | G06F 3/0445 345/206 |
| 2013/0033450 | A1* | 2/2013 | Coulson | G06F 3/041 345/174 |
| 2013/0321341 | A1* | 12/2013 | Takahama | G06F 3/044 345/174 |
| 2014/0062933 | A1* | 3/2014 | Coulson | G06F 3/0445 345/174 |
| 2014/0062934 | A1* | 3/2014 | Coulson | G06F 3/0445 345/174 |
| 2017/0344146 | A1 | 11/2017 | Sun et al. | |
| 2019/0317626 | A1* | 10/2019 | Lee | G06F 3/0416 |

FOREIGN PATENT DOCUMENTS

WO   WO-2013157532 A1 * 10/2013 ......... G02F 1/13338

* cited by examiner

*Primary Examiner* — Darlene M Ritchie
(74) *Attorney, Agent, or Firm* — ScienBiziP, P.C.

(57) ABSTRACT

A touch panel including a sense electrode having a rectangular shape extending in a first direction and including a first sense electrode and a second sense electrode, and a drive electrode having a rectangular shape extending in a second direction intersecting with the first direction on the sense electrode and including a first drive electrode having a shielding property against electric field components. The first drive electrode is positioned covering at least a part of the first sense electrode in a planar view in which the sense electrode is viewed from the drive electrode.

8 Claims, 20 Drawing Sheets

TOUCH PANEL, DISPLAY DEVICE, AND INPUT DEVICE HAVING SHIELDING FOR TOUCH SENSING ELECTRODES AND/OR PRESSURE SENSING ELECTRODES

CROSS-REFERENCE TO RELATED APPLICATION

The present application claims priority from U.S. Provisional Application Ser. No. 63/084,515, the content to which is hereby incorporated by reference into this application.

BACKGROUND

1. Field

The present disclosure relates to a touch panel, a display device, and an input device.

2. Description of the Related Art

For example, US Patent Application No. 2017/0344146 discloses a touch control device (input device) capable of detecting the touch position of a detection target object on a touch panel and the pressing force (touch force) of the detection target object against the touch panel. The input device disclosed in US Patent Application No. 2017/0344146 includes two electrodes (a first electrode and a fourth electrode) functioning as mutual-capacitive drive electrodes on the same upper layer and an electrode (a second electrode) functioning as a sense electrode on a lower layer. In the touch control device, capacitance is formed between one electrode (the fourth electrode) of the two electrodes provided on the upper layer and the electrode (the second electrode) provided on the lower layer, and touch positions can be detected based on the changes in the capacitance between the two electrodes. In addition, the fourth electrode and the second electrode have a striped shape, and the other electrode (the first electrode) of the two electrodes provided on the upper layer is disposed in a position where the fourth electrode and the second electrode intersect with each other in a planar view. Then, capacitance is formed between the first electrode and the second electrode, and the touch forces can be detected based on the changes in the capacitance between the two electrodes.

SUMMARY

However, in the input device disclosed in US Patent Application No. 2017/0344146 described above, the first electrode and the fourth electrode functioning as drive electrodes are provided on the same layer, and the first electrode is disposed in an intersection position where the fourth electrode and the second electrode intersect with each other in a planar view. In a configuration in which a plurality of the first electrodes, a plurality of the second electrodes and a plurality of the fourth electrodes are provided in such an electrode arrangement pattern, the first electrodes are disposed in each of the fourth electrodes at predetermined intervals in accordance with each intersection position described above in the input device. Thus, the input device needs to include a connection wiring line disposed across the fourth electrode and connecting between the first electrodes disposed adjacent to each other. Therefore, the fourth electrode is affected by a capacitive load included in the connection wiring line, and as a result, there is a problem that the touch positions and pressing forces cannot be detected with high accuracy.

The present disclosure has been made in view of the problem described above. An object of the present disclosure is to provide a touch panel, a display device, and an input device capable of detecting touch positions and pressing forces with high accuracy.

A touch panel according to an aspect of the present disclosure includes a sense electrode including a first sense electrode and a second sense electrode, the sense electrode having a rectangular shape extending in a first direction, and a drive electrode including a first drive electrode having a shielding property against electric field components, the drive electrode having a rectangular shape extending in a second direction intersecting with the first direction on the sense electrode. The first drive electrode is positioned covering at least a part of the first sense electrode in a planar view in which the sense electrode is viewed from the drive electrode.

A display device according to an aspect of the present disclosure includes a sense electrode including a first sense electrode and a second sense electrode, the sense electrode having a rectangular shape extending in a first direction, and a drive electrode including a first drive electrode having a shielding property against electric field components, the drive electrode having a rectangular shape extending in a second direction intersecting with the first direction on the sense electrode. The first drive electrode includes a touch panel positioned covering at least a part of the first sense electrode in a planar view in which the sense electrode is viewed from the drive electrode, and a display portion having a display surface configured to display images, the touch panel being disposed on the display surface.

An input device according to an aspect of the present disclosure includes a sense electrode including a first sense electrode and a second sense electrode, the sense electrode having a rectangular shape extending in a first direction, and a drive electrode including a first drive electrode having a shielding property against electric field components, the drive electrode having a rectangular shape extending in a second direction intersecting with the first direction on the sense electrode. The first drive electrode includes a touch panel positioned covering at least a part of the first sense electrode in a planar view in which the sense electrode is viewed from the drive electrode, a signal intensity output portion configured to output, when the sense electrode or the drive electrode receives a signal generated from a detection target object, an intensity of the signal, and a posture determination portion configured to determine that a posture of the detection target object has not been changed when the intensity of the signal output from the signal intensity output portion falls within a certain range.

DETAILED DESCRIPTION

Figure 1:
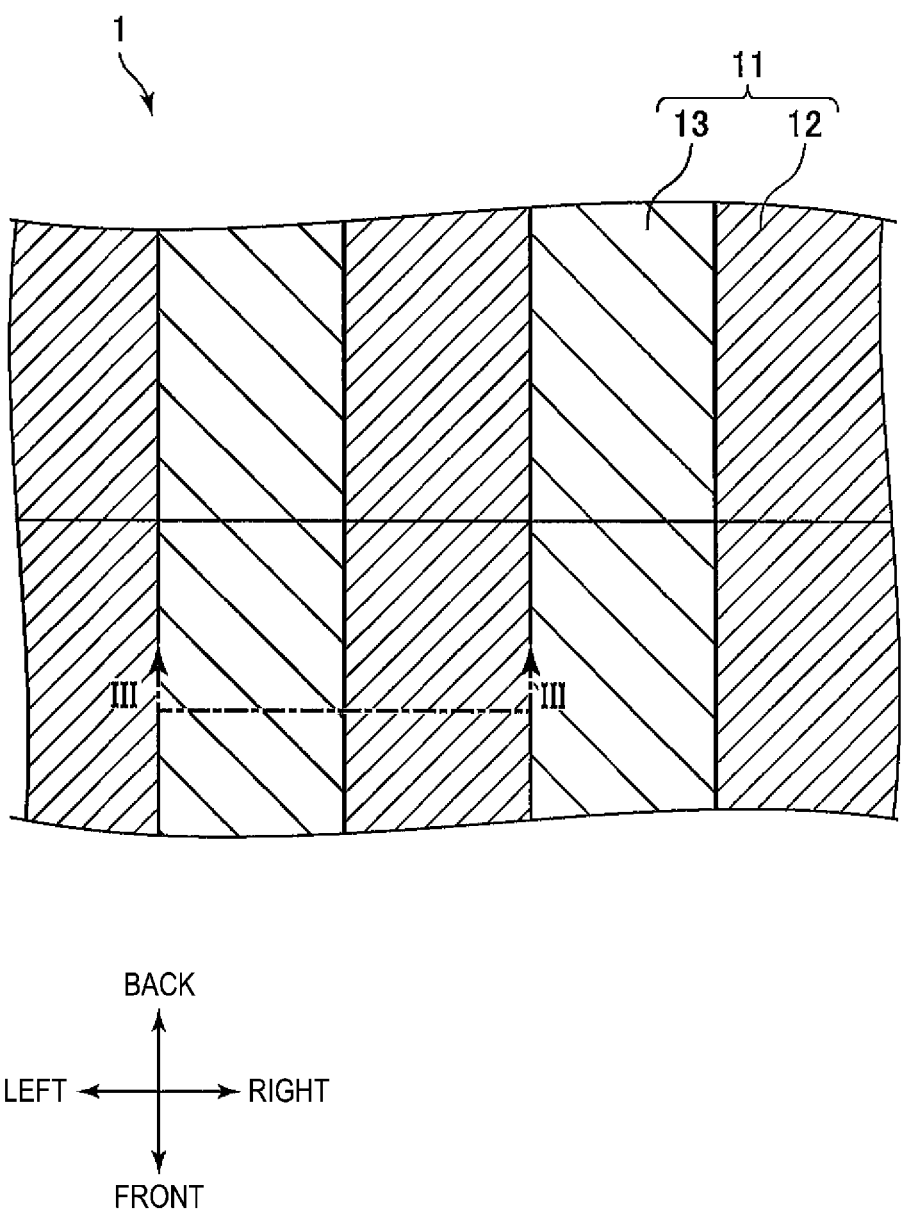
FIG. 1 is a plan view illustrating a configuration of a drive electrode included in a touch panel according to a first embodiment of the present disclosure.

Hereinafter, embodiments of the present invention will be described in detail with reference to the drawings. In the drawings, identical or corresponding parts are denoted by the same reference signs, and the description thereof will not be repeated. Note that, for ease of description, in the drawings referred to below, the configuration may be simplified or schematically illustrated, or some of the components may be omitted. Further, the dimensional ratios between the components illustrated in the drawings are not necessarily indicative of actual dimensional ratios. Further, in the drawings referred to below, various electrodes are displayed with hatching in order to facilitate the identification of various electrodes.

First Embodiment

Figure 2:
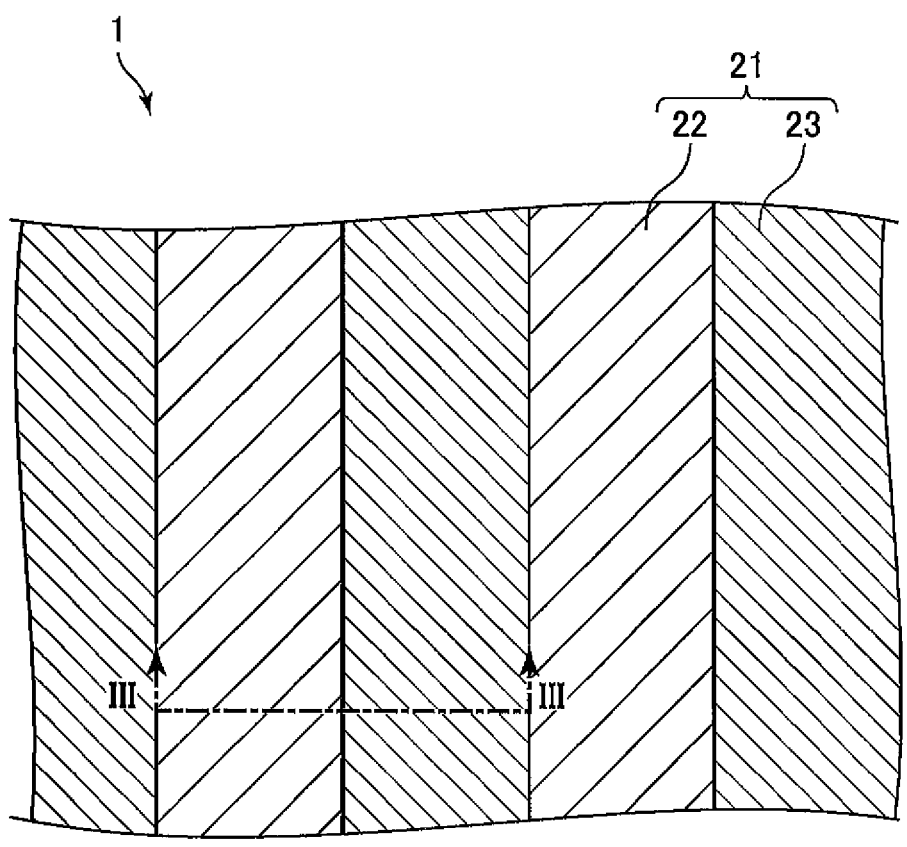
FIG. 2 is a plan view illustrating a configuration of a sense electrode included in a touch panel according to a first embodiment of the present disclosure.
Figure 2:
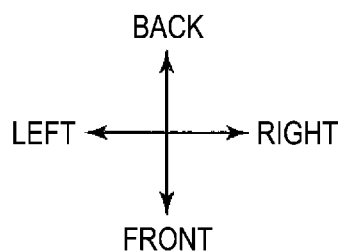

A touch panel 1 according to a first embodiment will be described with reference to FIGS. 1 to 4. FIG. 1 is a plan view illustrating a configuration of a drive electrode 11 included in a touch panel 1 according to the first embodiment of the present disclosure. FIG. 2 is a plan view illustrating a configuration of a sense electrode 21 included in a touch panel 1 according to the first embodiment of the present disclosure.

In the present specification, the side on which a detection target object F comes into contact is referred to as an upper side and the opposite side is referred to as a lower side in the touch panel 1. In the touch panel 1, the drive electrode 11 and the sense electrode 21 are respectively disposed in different layers. While FIG. 1 illustrates a configuration of the drive electrode 11 disposed in a layer above another layer in which the sense electrode 21 is provided, FIG. 2 illustrates a configuration of the sense electrode 21 disposed in a layer below another layer in which the drive electrode 11 is provided. As described above, for the convenience of illustration, the drive electrode 11 and the sense electrode 21 included in the touch panel 1 are separately illustrated in FIG. 1 and FIG. 2. In FIG. 1 and FIG. 2, the right-left direction in the drawing corresponds to the horizontal direction, and the bottom-top direction in the drawing corresponds to the front-back direction.

Figure 3:
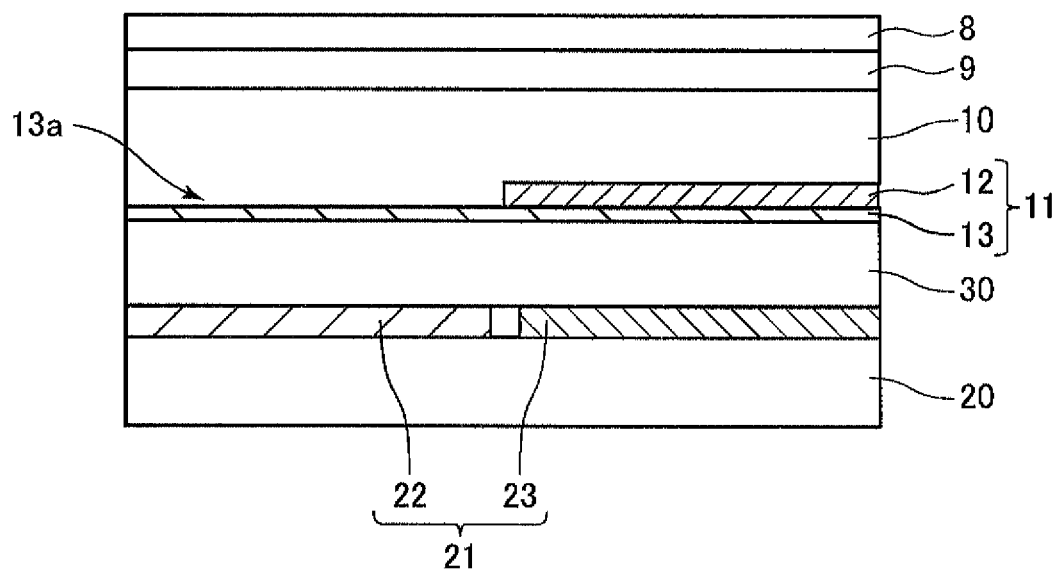
FIG. 3 is a cross-sectional view illustrating the cross section taken along a line III-III in FIG. 1 and FIG. 2.

FIG. 3 is a cross-sectional view illustrating the cross section taken along a line III-III in FIG. 1 and FIG. 2. Since FIG. 3 is a schematic view, hatching or the like indicating a cross-sectional structure is omitted, and only hatching identifying electrodes is used. In FIG. 3, the top-bottom direction in the drawing corresponds to the vertical direction, and the right-left direction in the drawing corresponds to the horizontal direction.

Figure 4:
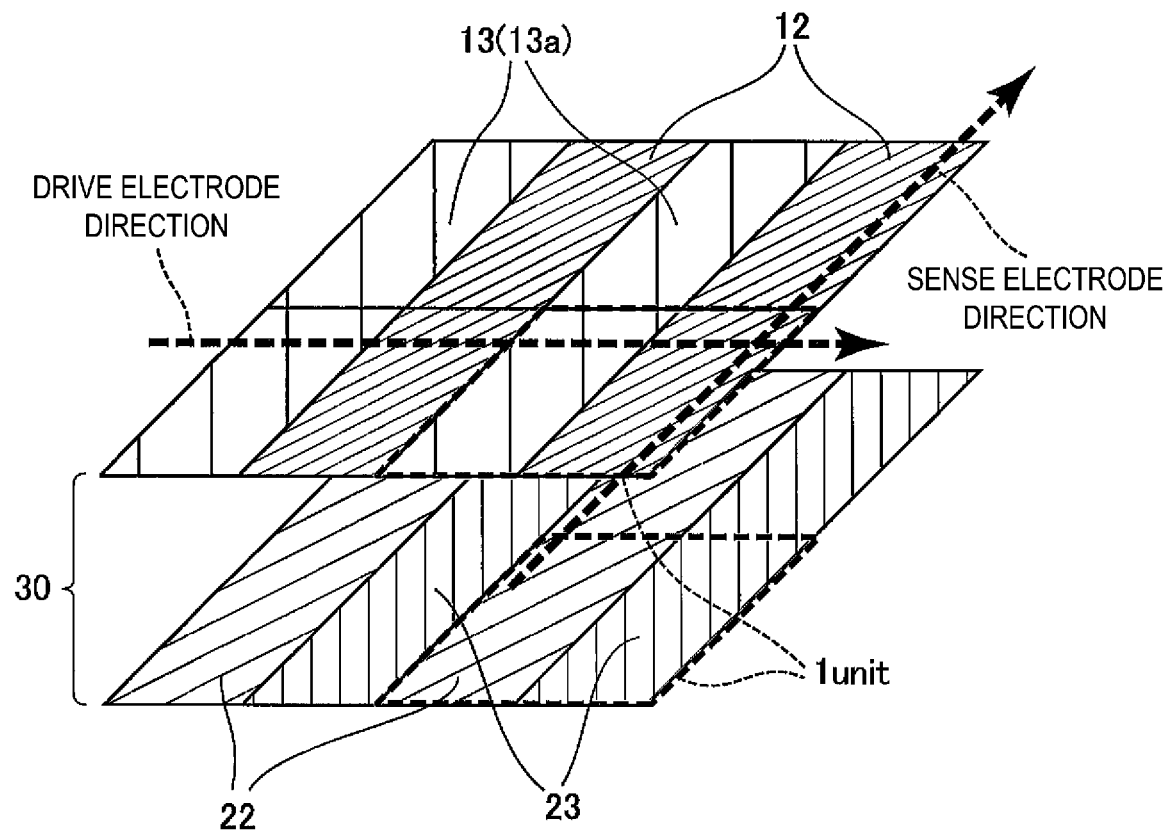
FIG. 4 is a perspective view schematically illustrating the positional relationship between a drive electrode and a sense electrode included in a touch panel according to a first embodiment of the present disclosure.
Figure 4:
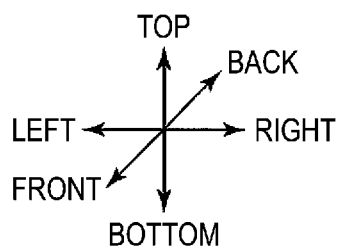

FIG. 4 is a perspective view schematically illustrating the positional relationship between the drive electrode 11 and the sense electrode 21 included in the touch panel 1 according to the first embodiment of the present disclosure. In FIG. 4, the top-bottom direction in the drawing corresponds to the vertical direction, the right-left direction in the drawing corresponds to the horizontal direction, and the direction orthogonal to each of the vertical direction and the horizontal direction corresponds to the front-back direction.

As illustrated in FIG. 3, the touch panel 1 includes a first substrate 10, the drive electrode 11, a second substrate 20, the sense electrode 21, and a dielectric layer 30. The touch panel 1 is used for detecting the touch position of the detection target object F on the touch panel 1 and the pressing force (touch force) of the detection target object F against the touch panel 1 by a capacitive sensing method using the drive electrode 11 and the sense electrode 21, respectively. Specifically, the touch panel 1 generates an electric field between the drive electrode 11 and the sense electrode 21, and outputs a signal indicating the capacitance between the drive electrode 11 and the sense electrode 21. Based on the output signal, a controller 60 described later detects the changes in the capacitance. Then, the controller 60 determines the touch position of the detection target object F on the touch panel 1 and the pressing force (touch force) of the detection target object F against the touch panel 1.

The drive electrode 11 is an electrode to which drive signals are applied from outside during the operation of the touch panel 1. The drive electrode 11 includes a drive solid electrode 12 (first drive electrode) and a metal mesh 13, the drive solid electrode 12 being layered on the metal mesh 13. On the other hand, the sense electrode 21 includes a position detection electrode 22 (second sense electrode) and a pressing force detection electrode 23 (first sense electrode) in the same layer. As illustrated in FIG. 2 and FIG. 3, the sense electrode 21 has a rectangular shape extending in a sense electrode direction (first direction) described later. On the other hand, as illustrated in FIG. 1 and FIG. 3, the drive electrode 11 has a rectangular shape extending in a drive electrode direction described later intersecting with the sense electrode direction on the sense electrode 21. The drive electrode direction is preferably orthogonal to the sense electrode direction.

The touch panel 1 has a configuration in which the second substrate 20 provided with the sense electrode 21, the dielectric layer 30, and the first substrate 10 provided with the drive electrode 11 are layered in this order from lower to upper layers. In the touch panel 1, the first substrate 10 and the second substrate 20 are disposed in such a way that a lower face 101 (first surface) of the first substrate 10 and an upper face 201 (second surface) of the second substrate 20 face each other. In addition, the drive electrode 11 is provided on the lower face 101 of the first substrate 10, and the sense electrode 21 is provided on the upper face 201 of the second substrate 20. The first substrate 10 and the second substrate 20 can be made of transparent material having optical transparency such as glass. The dielectric layer 30 is provided between the first substrate 10 and the second substrate 20. The dielectric layer 30 can be made of transparent material having elasticity such as polymer material.

An upper face 102 of the first substrate 10 is covered by a cover film 8 with an intervention of an optical adhesive sheet 9 (OCA; Optical Clear Adhesive). The cover film 8 is a transparent protection film having optical transparency. The cover film 8 functions as a display surface of the touch panel 1, and also functions as a contact surface with which the detection target object F can contact. In the present specification, a surface formed by the cover film 8 is referred to as an input surface of the touch panel 1.

As described above, the drive electrode 11 is provided on the lower face 101 of the first substrate 10. The drive electrode 11 includes a plurality of the drive solid electrodes 12 (first electrodes) and a plurality of the metal meshes 13. The drive solid electrode 12 is made of a transparent conductive film such as an indium tin oxide (ITO) film having a rectangular flat plate outer shape. The metal mesh 13 having a rectangular shape is provided under the drive solid electrode 12, and the touch panel 1 is configured in such a way that the drive solid electrode 12 is sandwiched between the metal mesh 13 and the first substrate 10. The metal mesh 13 has a configuration in which, for example, thin metal wires made of silver (Ag), copper (Cu), or the like are wired. The thin metal wires forming the metal mesh 13 can be, for example, thin metal wires routed from a wiring electrode portion (not illustrated) disposed in a frame region provided in the outer circumference of the input surface of the touch panel 1.

As described above, the drive electrode 11 is composed of the drive solid electrode 12 and the metal mesh 13, the drive solid electrode 12 being made of a transparent conductive film. Consequently, a region where the drive solid electrode 12 is disposed has a higher shielding property to electric field components than a region where only the metal mesh 13 is disposed.

As illustrated in FIG. 3 and FIG. 4, in the touch panel 1, the plurality of the metal meshes 13 extending in the horizontal direction are disposed side by side in the front-back direction to correspond to the entire lower face 101 of the first substrate 10. In the present specification, the horizontal direction in which the metal mesh 13 extends may be referred to as the drive electrode direction (second direction). As described above, since the plurality of the metal meshes 13 are disposed to correspond to the entire lower face 101 of the first substrate 10, the transmittance of light transmitted through the touch panel 1 can be uniformed, and display unevenness can be reduced.

In addition, as illustrated in FIG. 1 and FIG. 4, the plurality of the drive solid electrodes 12 are disposed at regular intervals in the horizontal direction on each metal mesh 13. In the present specification, a region in the drive electrode 11 where only the metal mesh 13 is disposed between two adjacent drive solid electrodes 12 is referred to as a mesh region 13a (second electrode).

The dimension of the drive solid electrode 12 in the horizontal direction and the dimension of the mesh region 13a in the horizontal direction are appropriately defined depending on the relationship between the dimensions of the detection target object F and the detection sensitivity required. For example, in the case where the detection target object F is a stylus 50 (refer to FIG. 6 described later) and where the positions, postures, and the like of the stylus 50 need to be detected, the dimension of the drive solid electrode 12 in the horizontal direction and the dimension of the mesh region 13a in the horizontal direction preferably have the following relationship.

Specifically, as illustrated in FIG. 4, a range composed of one drive solid electrode 12 and one mesh region 13a is defined as one unit of the drive electrode 11. Further, a range of the position detection electrode 22 and the pressing force detection electrode 23 corresponding to the one unit of the drive electrode 11 is defined as one unit of the sense electrode 21. At this time, the dimension of the drive solid electrode 12 in the horizontal direction preferably occupies from 25% to 50% of the one unit of the drive electrode 11 in the horizontal direction. In other words, the dimension of the mesh region 13a in the horizontal direction preferably occupies from 50% to 75% of the one unit of the drive electrode 11 in the horizontal direction.

On the other hand, the sense electrode 21 is provided on the upper face 201 of the second substrate 20 as described above. The sense electrode 21 includes a plurality of the position detection electrodes 22 and a plurality of pressing force detection electrodes 23. The touch panel 1 outputs a signal indicating the capacitance between the drive electrode 11 and the position detection electrodes 22. Based on the signal, the controller 60 can determine the touch position of the detection target object F. In addition, the touch panel 1 outputs a signal indicating the capacitance between the drive electrode 11 and the pressing force detection electrode 23. Based on the signal, the controller 60 can determine the pressing force exerted on the touch panel 1 by the detection target object F.

Each of the position detection electrode 22 and the pressing force detection electrode 23 can be formed of a metal mesh in which thin metal wires are wired. Thus, the resistance values from one end to the other end of the position detection electrode 22 and the pressing force detection electrode 23 can be reduced compared to a case where the position detection electrode 22 and the pressing force detection electrode 23 are made of a transparent conductive film such as ITO.

As illustrated in FIG. 4, each of the position detection electrode 22 and the pressing force detection electrode 23 is a flat plate electrode having a rectangular outer shape extending in the front-back direction. In the present specification, the front-back direction in which the position detection electrode 22 and the pressing force detection electrode 23 extend may be referred to as the sense electrode direction (first direction).

In a planar view in which the second substrate 20 is viewed from the first substrate 10, the pressing force detection electrode 23 is positioned to overlap the drive solid electrode 12 in such a manner that the pressing force detection electrode 23 is fully covered by the drive solid electrode 12. Thus, as in the case of the arrangement pattern of the drive solid electrode 12, the plurality of the pressing force detection electrodes 23 are disposed side by side at regular intervals in the horizontal direction.

As illustrated in FIG. 2 and FIG. 4, in the sense electrode 21, the position detection electrode 22 is disposed between two adjacent pressing force detection electrodes 23. Thus, the sense electrode 21 has a striped arrangement pattern in which the plurality of pressing force detection electrodes 23 and the plurality of the position detection electrodes 22 both having a rectangular shape and extending in the front-back direction are alternately disposed in the horizontal direction.

Therefore, the dimensions of the position detection electrode 22 and the pressing detection electrode 23 in the horizontal direction respectively depend on the dimensions of the mesh region 13a and the drive solid electrode 12 in the horizontal direction. Specifically, the dimension of the position detection electrode 22 in the horizontal direction occupies from 50% to 75% of the one unit of the sense electrode 21 in the horizontal direction. In other words, the dimension of the pressing force detection electrode 23 in the horizontal direction occupies from 25% to 50% of the one unit of the sense electrode 21 in the horizontal direction.

As described above, each of the plurality of the metal meshes 13 is a flat plate electrode having a rectangular outer shape extending in the horizontal direction, and is disposed side by side in the front-back direction on the lower face 101 of the first substrate 10. Thus, each of the plurality of the metal meshes 13 can be connected to the wiring electrode portion (not illustrated) disposed in the frame region of the touch panel 1 via an extraction electrode provided at an end (the other end) of the drive electrode 11 in the horizontal direction.

Further, the position detection electrode 22 and the pressing force detection electrode 23 have a rectangular flat plate shape extending in the front-back direction. Thus, the sense electrode 21 can be connected to the wiring electrode portion disposed in the frame region of the touch panel 1 via an extraction electrode provided at an end (the other end) of each of the position detection electrode 22 and the pressing force detection electrode 23 in the front-back direction.

As described above, the touch panel 1 according to the first embodiment does not have a configuration in which a connection wiring line connecting between one electrodes (first electrodes) disposed adjacent to each other is provided across the other electrode (fourth electrode) as in US Patent Application No. 2017/0344146. Thus, the touch panel 1 according to the first embodiment can eliminate the influence of a capacitive load included in the connection wiring line.

Detection Operation

Figure 5:
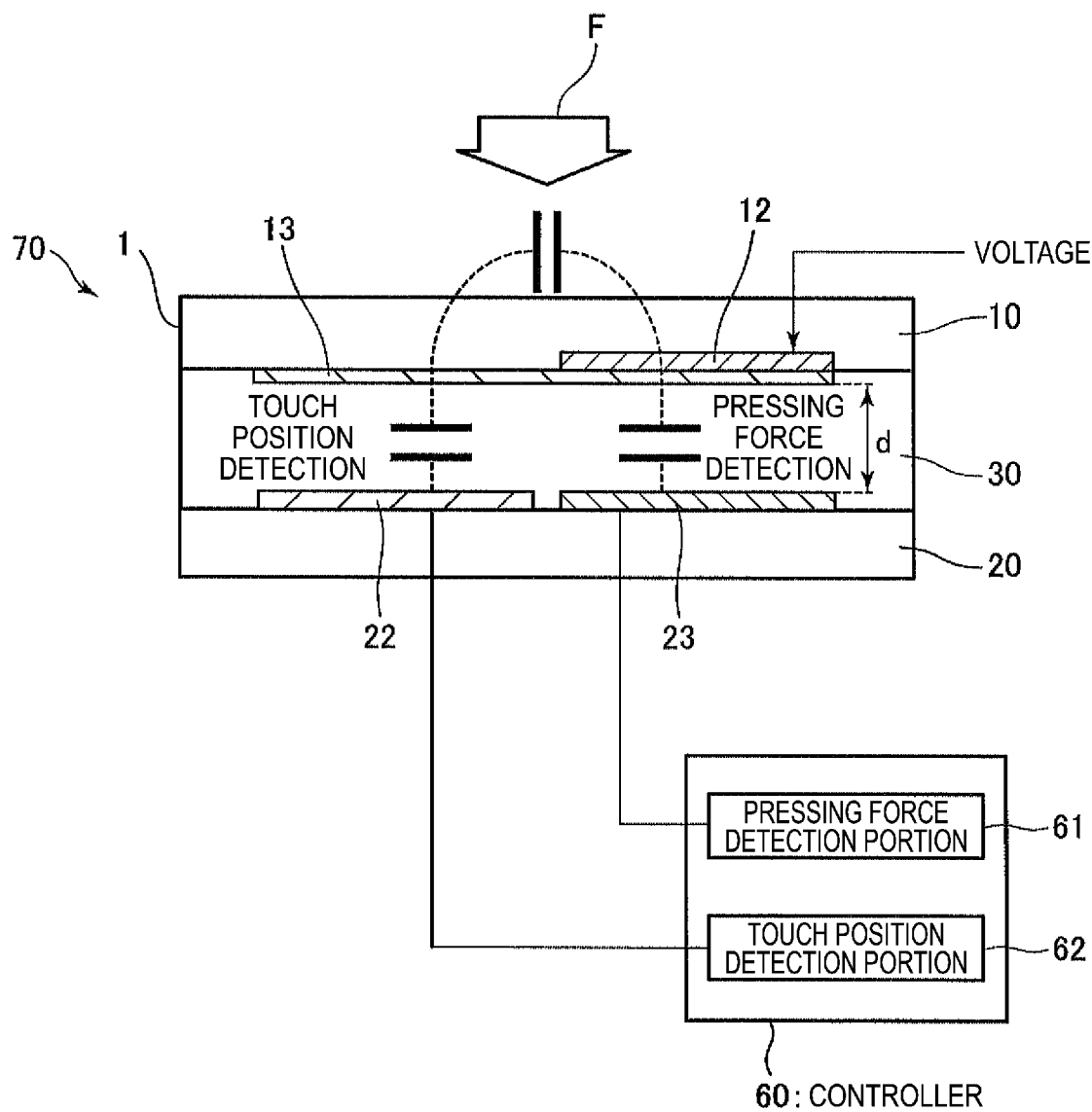
FIG. 5 is a schematic view illustrating an example of the operation to detect a detection target object by a touch panel included in an input device according to a first embodiment of the present disclosure.

Next, the operation to detect a detection target object F on a touch panel 1 will be described with reference to FIG. 5 using an input device 70 provided with the touch panel 1 as an example. FIG. 5 is a schematic view illustrating an example of the operation to detect the detection target object F by the touch panel 1 included in the input device 70 according to the first embodiment of the present disclosure. In FIG. 5, electrical lines of force corresponding to the capacitive coupling generated between the detection target object F and the various electrodes and the capacitive coupling generated between the various electrodes are indicated by dashed lines. FIG. 5 describes an example where the detection target object F is a users finger.

The input device 70 is a device configured to perform processing in accordance with information (instruction) input by the contact of the detection target object F with the touch panel 1. As illustrated in FIG. 5, the input device 70 includes the touch panel 1 described above and the controller 60 that performs various controls based on signals output from the touch panel 1. In FIG. 5, for convenience of explanation, only the functional blocks of the controller 60 that perform the functions related to the operation to detect the detection target object F are shown.

When a voltage is applied to the drive electrode 11 of the touch panel 1 in the input device 70, the drive electrode 11 is capacitively coupled with the position detection electrode 22. When a finger as the detection target object F contacts the input surface on the upper face 102 of the first substrate 10, the capacitance between the drive electrode 11 and the position detection electrode 22 is reduced by the finger. Thus, the magnitude of a signal output from the position detection electrode 22 to the controller 60 is changed. In the input device 70, a touch position detection portion 62 detects the changes in the capacitance based on the signal output from the position detection electrode 22. Then, the touch position detection portion 62 calculates a center position of the intensity distribution of the changed capacitance detected and determines the touch position of the detection target object F.

In addition, when the input surface is depressed by a finger, the distance d between the drive electrode 11 and the pressing force detection electrode 23 is reduced. Thus, the capacitance between the drive electrode 11 and the pressing force detection electrode 23 is increased, and the magnitude of a signal output from the pressing force detection electrode 23 to the controller 60 is changed. In the input device 70, a pressing force detection portion 61 detects the changes in the capacitance based on the signal output from the press force detection electrode 23. Then, the pressing force detection portion 61 can determine the pressing force exerted by the finger on the touch panel 1 based on the changes in the capacitance detected. In this manner, the input device 70 can determine touch positions and pressing forces by a capacitive sensing method using the touch panel 1 of a mutual-capacitive type.

In some cases, only the positions (touch positions) at which the detection target object F (finger) contacts the touch panel 1 are detected. That is, the touch panel 1 is not intended to be depressed by a finger and only the touch position of a finger on the touch panel 1 is detected.

In such a case, a pressing force can be erroneously detected when the capacitance between the drive electrode 11 and the pressing force detection electrode 23 capacitively coupled with each other is changed due to the contact of the finger with the touch panel 1. Therefore, in the touch panel 1 according to the first embodiment, the drive electrode 11 is made of an ITO film having a higher shielding property to electric field components than a metal mesh. Furthermore, in a planar view in which the second substrate 20 is viewed from the first substrate 10, the pressing force detection electrode 23 is disposed in such a way that the pressing force detection electrode is covered by the drive electrode 11. Thus, the changes in the capacitance between the drive electrode 11 and the pressing force detection electrode 23 due to the contact of the finger can be prevented from occurring. Therefore, erroneous detection of pressing forces can be prevented when only a touch position of a finger is detected as described above.

Stylus Tilt Detection Operation

In the above description, a users finger is taken as an example of the detection target object F of the touch panel 1. However, the detection target object F may be a stylus 50 (touch pen). The stylus 50 can be used to write characters or draw pictures on the input surface of the touch panel 1.

Figure 6:
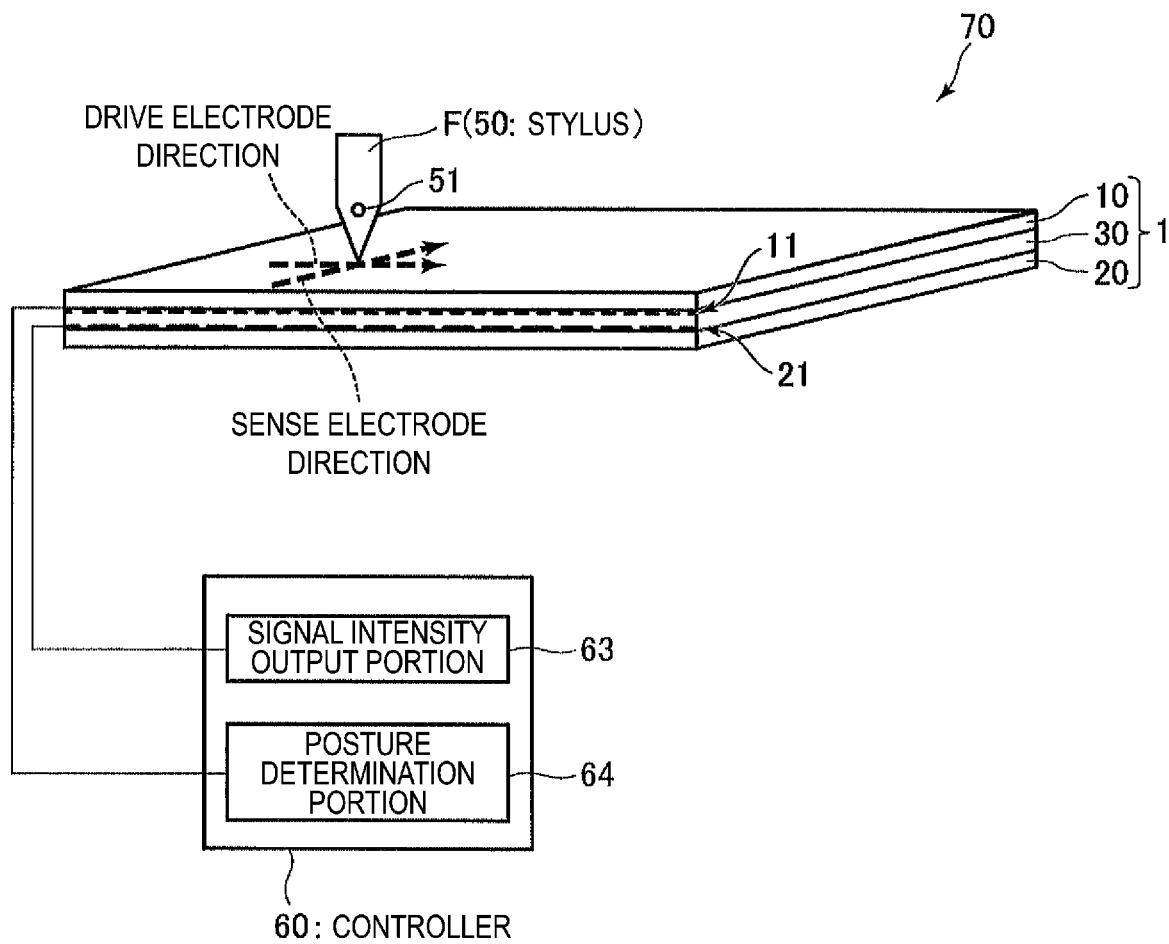
FIG. 6 is a view schematically illustrating an example of the operation to detect the tilt of a stylus by a touch panel included in an input device according to a first embodiment of the present disclosure.

Here, in order for the stylus 50 to provide a writing feeling similar to a writing instrument such as a brush pen, it is important that the touch panel 1 be configured to output not only signals indicating the touch positions and pressing forces of the stylus 50 on the input surface but also signals indicating the magnitude of the tilt of the stylus 50 with respect to the input surface. In the following, the operation to detect the magnitude of the tilt of the stylus 50 on the touch panel 1 will be described with reference to FIG. 6 using the input device 70 provided with the touch panel 1 as an example. FIG. 6 is a schematic view illustrating an example of the operation to detect the tilt of the stylus 50 by the touch panel 1 included in the input device 70 according to the first embodiment of the present disclosure. In FIG. 6, for convenience of explanation, only the functional blocks of the controller 60 that perform the functions related to the operation to detect the tilt of the stylus 50 are shown. Specifically, the controller 60 further includes a signal intensity output portion 63 and a posture determination portion 64 as functional blocks related to the operation to detect the tilt of the stylus 50.

First, the stylus 50 includes a signal output portion 51 that outputs signals of a certain intensity to the touch panel 1. In the input device 70, in the case of detecting the magnitude of the tilt of the stylus 50 with respect to the input surface, the stylus 50 that outputs signals to the touch panel 1 functions as a drive electrode, and each of the drive electrode 11 and the sense electrode 21 described above functions as a sense electrode that receives signals output from the stylus 50.

Upon receiving a signal output from the signal output portion 51, the drive electrode 11 or the sense electrode 21 outputs the signal to the controller 60. In the controller 60, upon receiving the signal output from the drive electrode 11 or the sense electrode 21, the signal intensity output portion 63 determines the intensity of the signal. Then, the signal intensity output portion 63 outputs the determined intensity of the signal to the posture determination unit 64.

The posture determination portion 64 determines whether or not the position of the stylus 50 has been changed, depending on whether or not the intensity of the signal output from the signal intensity output portion 63 falls within a certain range (within a range of 1 db). When the signal output from the signal intensity output portion 63 falls within the certain range, the posture determination portion 64 determines that the tilt of the stylus 50 has not been changed.

In other words, when the stylus 50 is tilted from a posture perpendicular to the input surface, the distance between the signal output portion 51 included in the stylus 50 and the drive electrode 11 or the sense electrode 21 is reduced. Thus, the intensity of the signal received by the drive electrode 11 or the sense electrode 21 is increased. Accordingly, the controller 60 can determine the tilt of the stylus 50 based on the changes in the magnitude of the intensity of the signal.

For this reason, in order for the controller 60 to determine the magnitude of the tilt of the stylus 50 with high accuracy, it is necessary to prevent the intensity of signals received by the drive electrode 11 or the sense electrode 21 from varying depending on positions in the input surface of the touch panel 1. In other words, regardless of the positions of the stylus 50 on the input surface, the intensity of signals received by the drive electrode 11 or the sense electrode 21 directly below the stylus 50 needs to be constant unless the posture of the stylus 50 is changed.

For example, in a configuration in which a plurality of sense electrodes having a diamond shape are connected with each other in a diagonal direction (one direction) in a diamond pattern, the intensity of signals received by the sense electrodes varies depending on the positions of the stylus 50 on the input surface. Specifically, in the configuration with the diamond pattern described above, the movement of the stylus 50 along the one direction corresponds to the movement of the stylus 50 on the sense electrodes along the diagonal direction. Here, the area of each sense electrode having a diamond shape is smaller in the vicinity of its vertices than in its center. For this reason, even in the same sense electrode, the intensity of received signals differs between when the stylus 50 is directly above the center of the sense electrode and when the stylus 50 is directly above the vicinity of a vertex of the sense electrode.

On the other hand, the touch panel 1 according to the first embodiment of the present disclosure has a configuration in which the plurality of the drive electrodes 11 having a rectangular shape extending in the horizontal direction (drive electrode direction) are disposed on the first substrate 10, and the plurality of the sense electrodes 21 having a rectangular shape extending in the front-back direction (sense electrode direction) are disposed on the second substrate 20. Thus, regardless of the positions of the stylus 50 on the input surface, the area of the electrode receiving signals output from the stylus 50 is constant. Therefore, in the touch panel 1 according to the first embodiment of the present disclosure, the intensity of signals received by the drive electrode 11 or the sense electrode 21 is considered to be constant without dependence on the positions of the stylus 50 as long as the posture of the stylus 50 is not changed.

Thus, the changes in the intensity of the signals received by the drive electrode 11 and the sense electrode 21 were examined by moving the stylus 50 as described below. Specifically, as illustrated in FIG. 6, the stylus 50 was moved at a constant speed in each of the drive electrode direction and the sense electrode direction in a posture perpendicular to the input surface of the touch panel 1. Then, the changes in the intensity of the signals received from the stylus 50 by each of the drive electrode 11 and the sense electrode 21 were examined and the results are as shown in FIG. 7 and FIG. 8.

Figure 7:
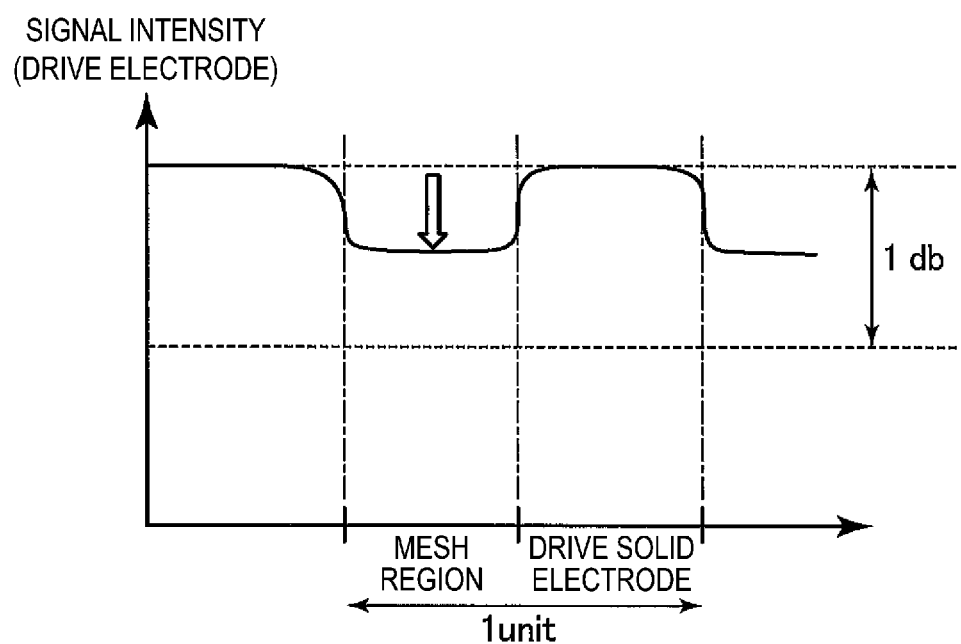
FIG. 7 is a graph showing the changes in the intensity of the signals received by a drive electrode when a stylus moves in a drive electrode direction in a touch panel according to a first embodiment of the present disclosure.
Figure 8:
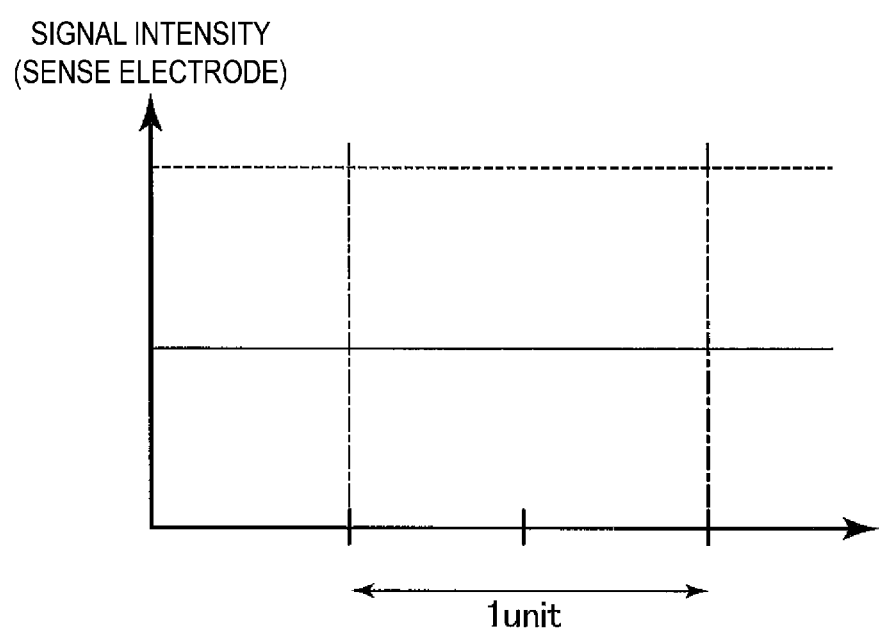
FIG. 8 is a graph showing the changes in the intensity of the signals received by a sense electrode when a stylus moves in a sense electrode direction in a touch panel according to a first embodiment of the present disclosure.

FIG. 7 is a graph showing the changes in the intensity of the signals received by the drive electrode 11 when the stylus 50 moves in the drive electrode direction in the touch panel 1 according to the first embodiment of the present disclosure. FIG. 8 is a graph showing the changes in the intensity of the signals received by the sense electrode 21 when the stylus 50 moves in the sense electrode direction in the touch panel 1 according to the first embodiment of the present disclosure.

FIG. 7 shows the changes in the intensity of the signals received by the drive electrode 11 when the stylus 50 moves in the drive electrode direction over a range of the input surface corresponding to the one unit of the drive electrode 11. Specifically, in FIG. 7, the horizontal axis represents the coordinate position of the stylus 50 on the input surface (the coordinate positions on an arbitrary axis extending in the drive electrode direction). The vertical axis represents the intensity of the signals received by the drive electrode 11 when the stylus 50 is at each coordinate position. FIG. 8 shows the changes in the intensity of the signals received by the sense electrode 21 when the stylus 50 moves in the sense electrode direction over a range of the input surface corresponding to the one unit of the sense electrode 21. Specifically, in FIG. 8, the horizontal axis represents the coordinate position of the stylus 50 on the input surface (the coordinate position on an arbitrary axis extending in the sense electrode direction). The vertical axis represents the intensity of the signals received by the sense electrode 21 when the stylus 50 is at each coordinate position. Note that the intensity of the signals received by the sense electrode 21 is the intensity of the signals received by the position detection electrode 22 when the stylus 50 moves directly above the position detection electrode 22, and is the intensity of the signals received by the pressing force detection electrode 23 when the stylus 50 moves directly above the pressing force detection electrode 23.

Here, the drive electrode 11 has a configuration in which the plurality of the drive solid electrodes 12 are disposed at regular intervals in the drive electrode direction on the metal mesh 13. Thus, in the case where the stylus 50 moves in the drive electrode direction, the intensity of the signals received by the drive electrode 11 differs between when the stylus 50 is above the drive solid electrode 12 and when the stylus 50 is above the mesh region 13a as shown in FIG. 7.

Specifically, in the case where the stylus 50 moves in the drive electrode direction, the intensity of the signals received by the drive electrode 11 is lower when the stylus 50 is moving above the mesh region 13a than when the stylus 50 is moving above the drive solid electrode 12. Thus, in the case where the stylus 50 moves in the drive electrode direction, the distribution indicating the changes in the intensity of the signals received by the drive electrode 11 includes peaks (maximum values) and valleys (minimum values). However, as illustrated in FIG. 7, the difference between a maximum value and a minimum value of the intensity of the signals can be controlled to 1 dB or less. Thus, the intensity of the signals received by the drive electrode 11 can be said to be substantially constant without dependence on the position of the stylus 50 as long as the posture of the stylus 50 is not changed.

In the touch panel 1 according to the first embodiment, as described above, the dimension of the drive solid electrode 12 in the drive electrode direction occupies from 25% to 50% of the one unit of the drive electrode 11 in the horizontal direction (drive electrode direction). That is, in the drive electrode direction, the percentage that the drive solid electrode 12 occupies is equal to or less than the percentage that the mesh region 13a occupies. This allows reduction in the period of time in which the intensity of the signals received by the drive electrode 11 assumes a maximum value, and increase in the period of time in which the intensity assumes a minimum value, resulting in a more uniform signal intensity distribution as a whole.

On the other hand, as illustrated in FIG. 8, in the case where the stylus 50 moves in the sense electrode direction, the intensity distribution of the signals received by the sense electrode 21 is constant. That is, the intensity of signals received by the sense electrode 21 can be said to be constant without dependence on the positions of the stylus 50 as long as the posture of the stylus 50 is not changed.

MODIFIED EXAMPLE

As illustrated in FIG. 2 and FIG. 4, in the touch panel 1 according to the first embodiment, the sense electrode 21 has a configuration in which the position detection electrode 22 having a rectangular shape and the pressing force detection electrode 23 having a rectangular shape are alternately disposed in the horizontal direction.

Figure 9:
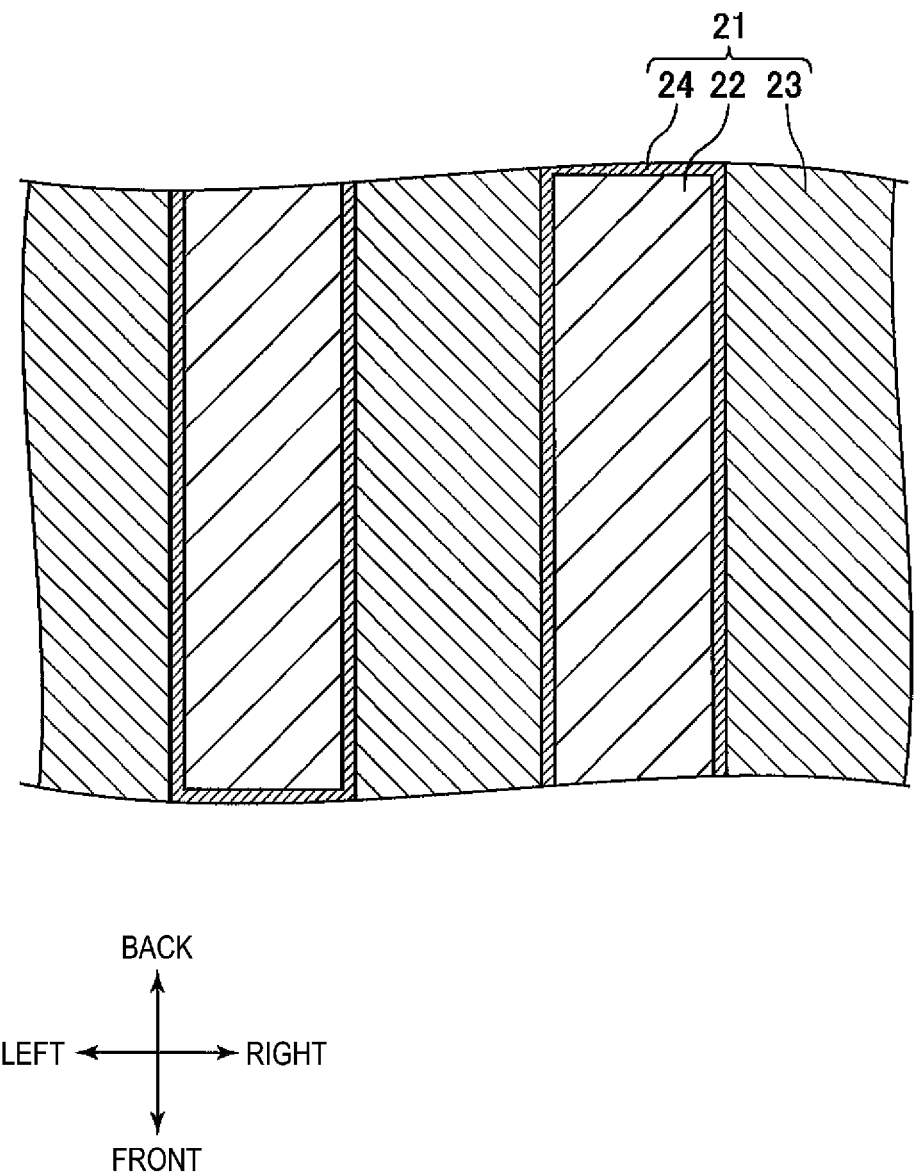
FIG. 9 is a plan view illustrating a configuration of a sense electrode of a touch panel according to a modified example of a first embodiment of the present disclosure.

In contrast, as illustrated in FIG. 9, a touch panel 1 according to a modified example of the first embodiment has a configuration in which a shield electrode 24 is further provided along the outer circumference of the pressing force detection electrode 23. The touch panel 1 according to the modified example of the first embodiment has a similar configuration to the touch panel 1 according to the first embodiment except that the shield electrode 24 is further provided, and thus common structural elements are denoted by the same reference signs and descriptions of them are omitted. FIG. 9 is a plan view illustrating a configuration of the sense electrode 21 of the touch panel 1 according to the modified example of the first embodiment of the present disclosure.

The shield electrode 24 is grounded and is an electrode configured to prevent erroneous detection of pressing forces by the pressing force detection electrode 23. Specifically, the shield electrode 24 prevents the changes in the capacitance between the drive electrode 11 and the pressing force detection electrode 23 due to the capacitive coupling of the detection target object F with each of the drive electrode 11 and the pressing force detection electrode 23 even though the detection target object F is not pressed against the touch panel 1. Thus, with the shield electrode 24 described above, the touch panel 1 according to the modified example of the first embodiment can detect the magnitude of pressing forces with higher accuracy.

Second Embodiment

Figure 10:
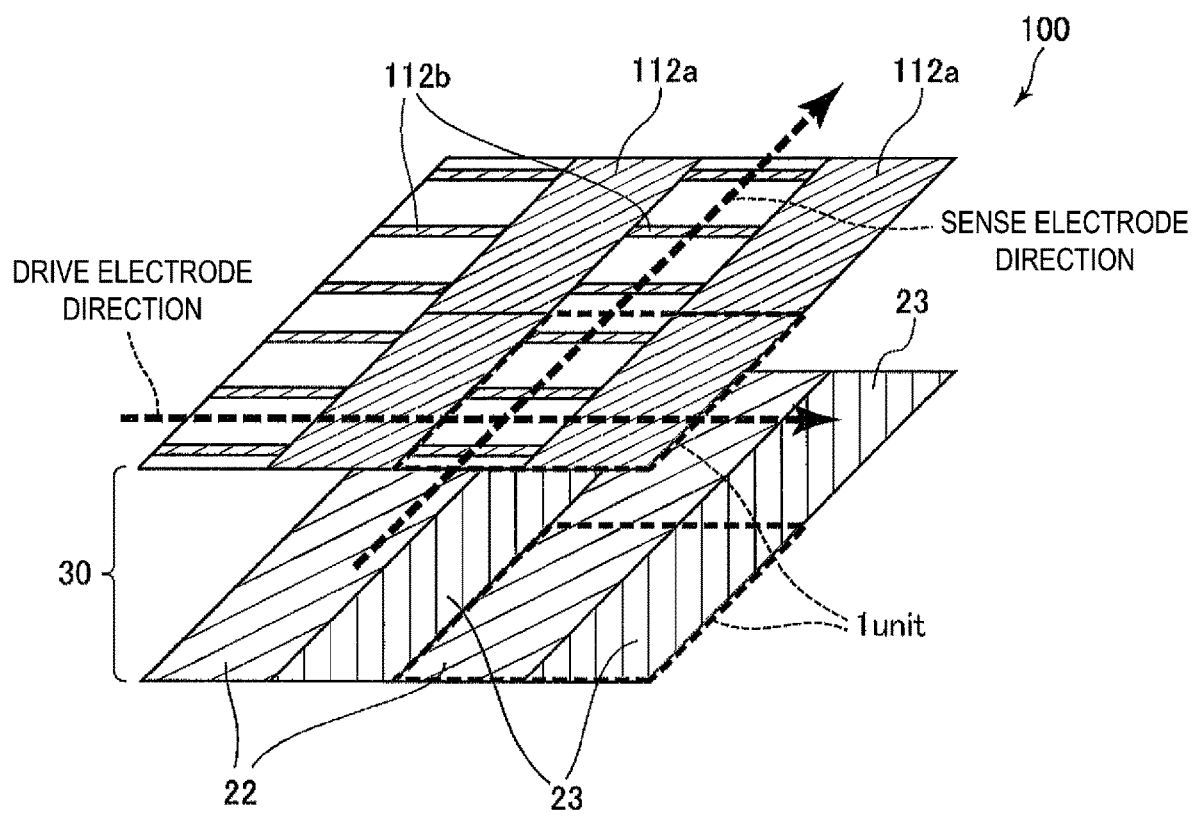
FIG. 10 is a perspective view schematically illustrating the positional relationship between a drive electrode and a sense electrode included in a touch panel according to a second embodiment of the present disclosure.
Figure 10:
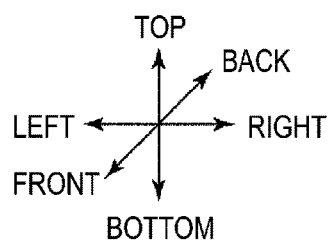
Figure 11:
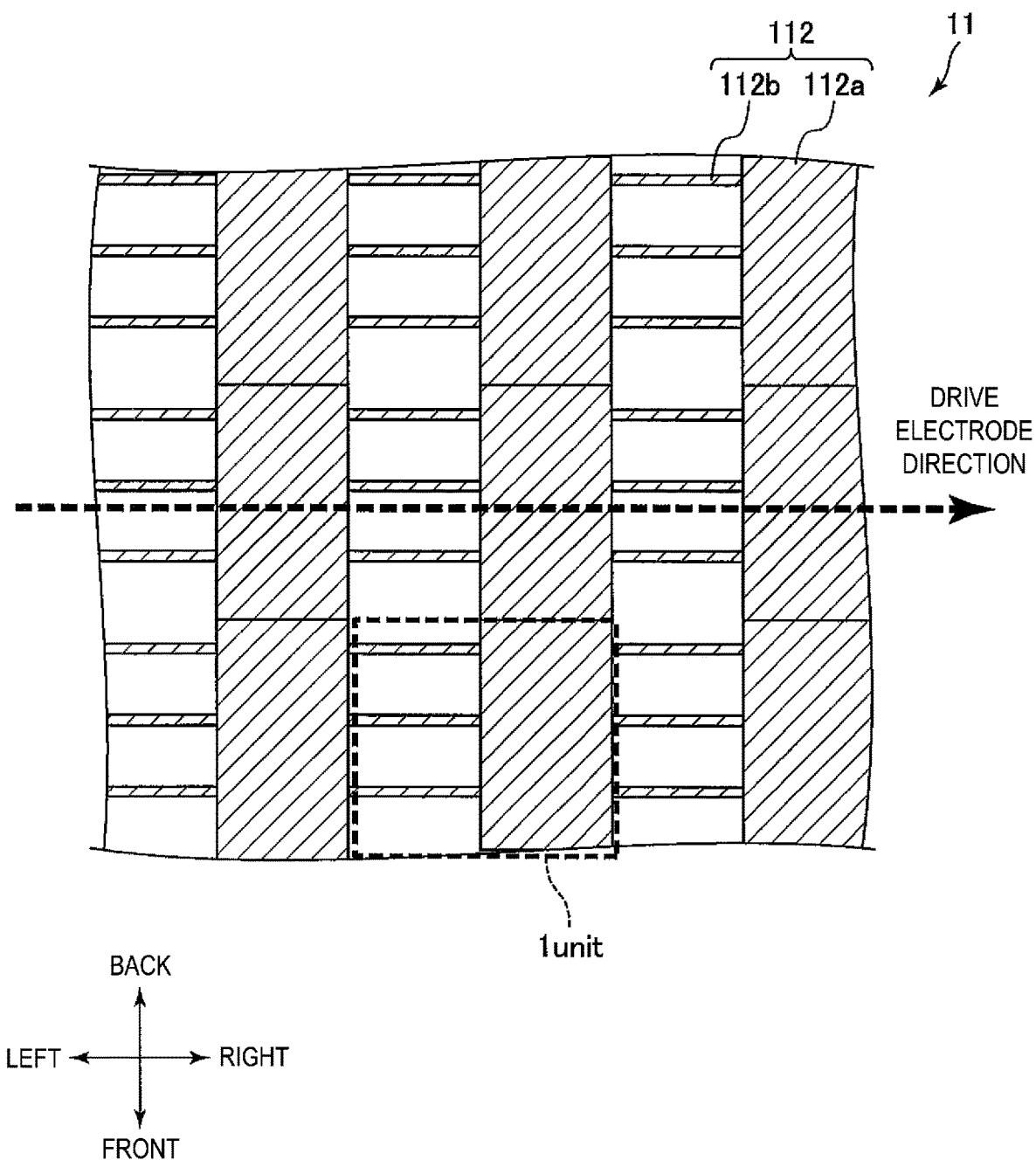
FIG. 11 is a plan view illustrating a configuration of the drive electrode illustrated in FIG. 10.

A touch panel 100 according to a second embodiment will be described with reference to FIG. 10 and FIG. 11. FIG. 10 is a perspective view schematically illustrating the positional relationship between the drive electrode 11 and the sense electrode 21 included in the touch panel 100 according to the second embodiment of the present disclosure. In FIG. 10, the top-bottom direction in the drawing corresponds to the vertical direction, the right-left direction in the drawing corresponds to the horizontal direction, and the direction orthogonal to each of the vertical direction and the horizontal direction corresponds to the front-back direction. FIG. 11 is a plan view illustrating a configuration of the drive electrode 11 illustrated in FIG. 10. In FIG. 11, the bottom-top direction in the drawing corresponds to the front-back direction, and the right-left direction in the drawing corresponds to the horizontal direction.

As illustrated in FIG. 10 and FIG. 11, the touch panel 100 according to the second embodiment is similar to the touch panel 1 according to the first embodiment except for a difference in a configuration of the drive electrode 11 provided on the lower face 101 of the first substrate 10. Thus, common structural elements are denoted by the same reference signs and descriptions of them are omitted.

In the touch panel 1 according to the first embodiment, the drive electrode 11 includes the plurality of the drive solid electrodes 12 made of a transparent conductive film such as ITO, and the plurality of the metal meshes 13. In contrast, as illustrated in FIG. 11, the touch panel 100 according to the second embodiment has a configuration in which the drive electrode 11 is composed of a drive solid electrode 112 made of a transparent conductive film such as an ITO film including a planar portion 112a (first electrode portion) having a rectangular flat plate shape, and a slit portion 112b (second electrode portion) in which a plurality of slits are provided between two planar portions 112a disposed adjacent to each other, in other words, a slit portion 112b in which a plurality of thin line portions are bridged.

In the touch panel 100 according to the second embodiment, the planar portion 112a of the drive solid electrode 112 is disposed in a position corresponding to the position of the drive solid electrode 12 included in the touch panel 1 according to the first embodiment, and the slit portion 112b of the drive solid electrode 112 is disposed in a position corresponding to the position of the mesh region 13a. In other words, while the drive electrode 11 according to the first embodiment includes the drive solid electrode 12 and the mesh region 13a both having a planar shape, the drive electrode 11 according to the second embodiment includes the slit portion 112b of the drive solid electrode 112 instead of the mesh region 13a.

Similarly to the touch panel 1 according to the first embodiment, in a planar view in which the second substrate 20 is viewed from the first substrate 10, the touch panel 100 according to the second embodiment has a configuration in which the pressing force detection electrode 23 is fully covered by the planar portion 112a of the drive solid electrode 112. Thus, as in the case of the touch panel 1 according to the first embodiment, in the touch panel 100 according to the second embodiment, the pressing force detection portion 61 can determine the magnitude of pressing forces with high accuracy based on signals output from the pressing force detection electrode 23. On the other hand, the slit portion 112b is disposed in an opposite position above the position detection electrode 22. Thus, the detection target object F can be capacitively coupled with the position detection electrode 22 through the slits formed in the slit portion 112b. Therefore, the touch position detection portion 62 can determine the touch positions of the detection target object F based on the signals output from the position detection electrode 22.

In addition, both of the planar portion 112a and the slit portion 112b of the drive solid electrode 112 are made of a transparent conductive film, and thus can be provided on the lower face 101 of the first substrate 10 in the same process.

Figure 12:
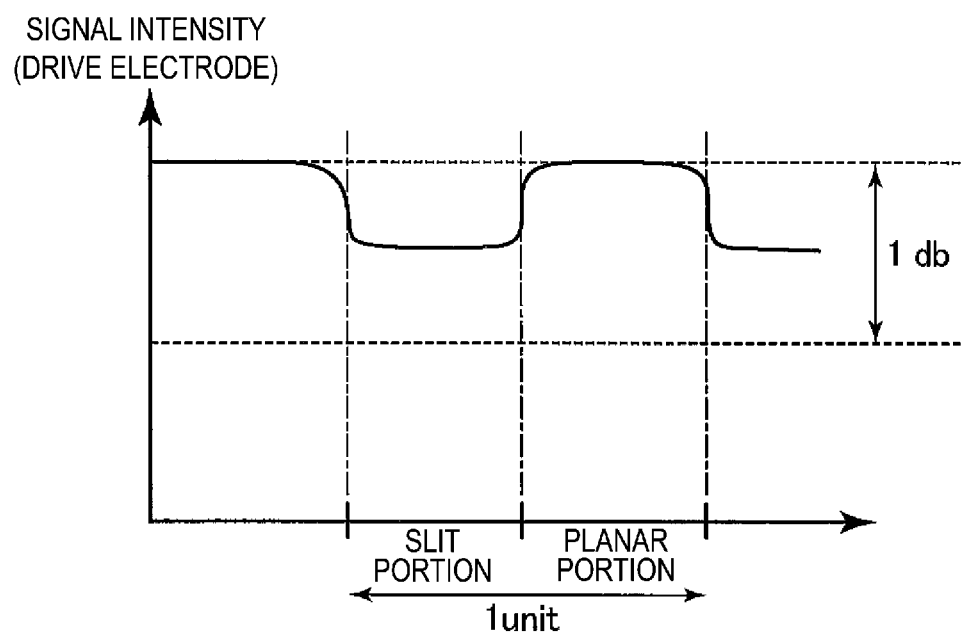
FIG. 12 is a graph showing the changes in the intensity of the signals received by a drive electrode when a stylus moves in a drive electrode direction in a touch panel according to a second embodiment of the present disclosure.
Figure 13:
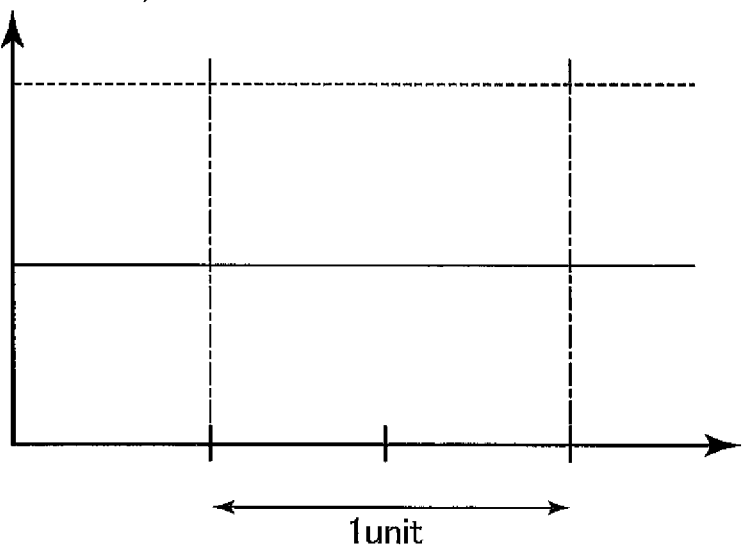
FIG. 13 is a graph showing the changes in the intensity of the signals received by a sense electrode when a stylus moves in a sense electrode direction in a touch panel according to a second embodiment of the present disclosure.

Then, in the touch panel 100 according to the second embodiment, the intensity of signals output from the signal output portion 51 of the stylus 50 and received by each of the drive electrode 11 and the sense electrode 21 were examined in the same manner as in the touch panel 1 according to the first embodiment, and the results are as shown in FIG. 12 and FIG. 13. FIG. 12 is a graph showing the changes in the intensity of the signals received by the drive electrode 11 when the stylus 50 moves in the drive electrode direction in the touch panel 100 according to the second embodiment of the present disclosure. FIG. 13 is a graph showing the changes in the intensity of the signals received by the sense electrode 21 when the stylus 50 moves in the sense electrode direction in the touch panel 100 according to the second embodiment of the present disclosure.

FIG. 12 shows the changes in the intensity of the signals received by the drive electrode 11 when the stylus 50 moves in the drive electrode direction over a range of the input surface corresponding to the one unit of the drive electrode 11. FIG. 13 shows the changes in the intensity of the signals received by the sense electrode 21 when the stylus 50 moves in the sense electrode direction over a range of the input surface corresponding to the one unit of the sense electrode 21.

Here, the drive electrode 11 is composed of the drive solid electrode 112 including the planar portion 112a and the slit portion 112b. Thus, in the case where the stylus 50 moves in the drive electrode direction, the intensity of the signals received by the drive electrode 11 differs between when the stylus 50 is above the planar portion 112a of the drive solid electrode 12 and when the stylus 50 is above the slit portion 112b as shown in FIG. 12.

Specifically, in the case where the stylus 50 moves in the drive electrode direction, the intensity of the signals received by the drive electrode 11 is lower when the stylus 50 is moving above the slit portion 112b than when the stylus 50 is moving above the planar portion 112a. Thus, in the case where the stylus 50 moves in the drive electrode direction, the distribution indicating the changes in the intensity of the signals received by the drive electrode 11 includes peaks (maximum values) and valleys (minimum values), as in the case of the touch panel 1 according to the first embodiment.

However, in the touch panel 100 according to the second embodiment, the difference between a maximum value and a minimum value of the intensity of the signals can be controlled to 1 dB or less, as in the case of the touch panel 1 according to the first embodiment. Thus, the intensity of the signals received by the drive electrode 11 can be said to be substantially constant without dependence on the positions of the stylus 50 as long as the posture of the stylus 50 is not changed.

In the touch panel 100 according to the second embodiment, the dimension of the planar portion 112a in the drive electrode direction occupies from 25% to 50% of the one unit of the drive electrode 11 in the horizontal direction (drive electrode direction). That is, in the drive electrode direction, the percentage that the planar portion 112a occupies is equal to or less than the percentage that the slit portion 112b occupies. This allows reduction in the period of time in which the intensity of the signals received by the drive electrode 11 assumes a maximum value, and increase in the period of time in which the intensity assumes a minimum value, resulting in a more uniform signal waveform as a whole.

On the other hand, as illustrated in FIG. 13, in the case where the stylus 50 moves in the sense electrode direction, the intensity distribution of the signals received by the sense electrode 21 is constant. That is, the intensity of the signals received by the sense electrode 21 can be said to be constant without dependence on the positions of the stylus 50.

Note that, the touch panel 100 according to the second embodiment may also have a configuration in which the shield electrode 24 is further provided along the outer circumference of the pressing force detection electrode 23, as in the case of the touch panel 1 according to the modified example of the first embodiment.

Modified Example of Second Embodiment

Figure 14:
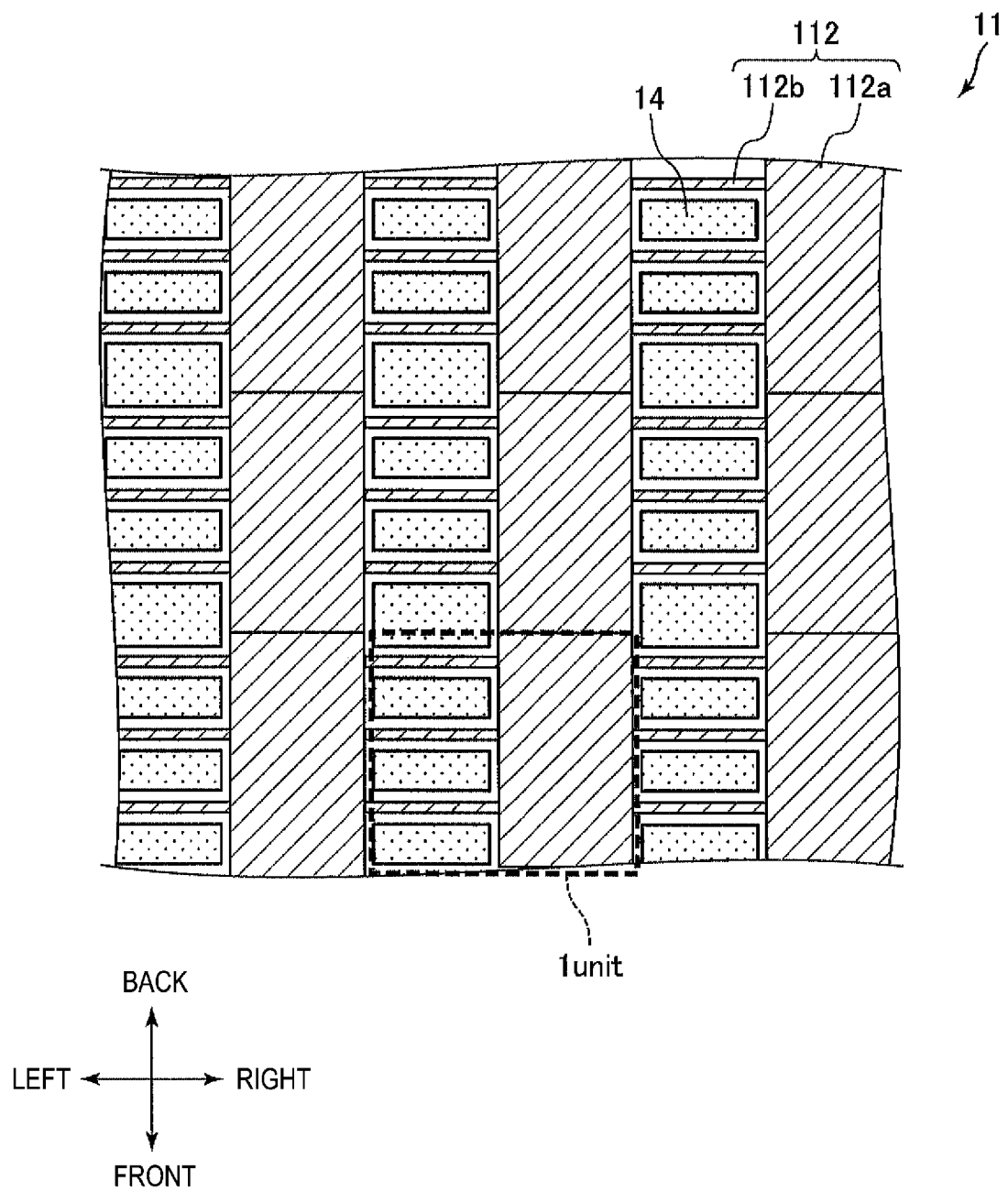
FIG. 14 is a plan view illustrating a configuration of a drive electrode included in a touch panel according to a modified example of a second embodiment of the present disclosure.

Next, a configuration of a touch panel 100 according to a modified example of the second embodiment will be described with reference to FIG. 14. FIG. 14 is a plan view illustrating a configuration of the drive electrode 11 included in the touch panel 100 according to the modified example of the second embodiment of the present disclosure. In FIG. 14, the right-left direction in the drawing corresponds to the horizontal direction, and the bottom-top direction in the drawing corresponds to the front-back direction.

The touch panel 100 according to the modified example of the second embodiment differs in the configuration of the drive electrode 11 from the touch panel 100 according to the second embodiment. Specifically, unlike the configuration of the drive electrode 11 included in the touch panel 100 according to the second embodiment, the drive electrode 11 included in the touch panel 100 according to the modified example of the second embodiment has a configuration in which a floating island electrode 14 is further provided in a notch portion of the slit portion 112b.

The floating island electrode 14 is made of an electrically conductive transparent material such as ITO. The floating island electrode 14 is formed on a region corresponding to the notch portion of the slit portion 112b on the lower face 101 of the first substrate 10 and is in a floating state.

In the configuration in which the floating island electrode 14 is provided in this manner, when the detection target object F such as a users finger contacts the input surface of the touch panel 100, the touch positions and pressing forces of the detection target object F are detected as follows.

When a voltage is applied to the drive electrode 11, the drive electrode 11 is capacitively coupled with the position detection electrode 22 via the floating island electrode 14. For example, when the detection target object F such as a users finger contacts the input surface of the touch panel 100, the detection target object F is capacitively coupled with each of the drive electrode 11 and the floating island electrode 14. Thus, the capacitance between the drive electrode 11 and the position detection electrode 22 is reduced via the detection target object F and the floating island electrode 14. Then, the touch position detection portion 62 detects the changes in the capacitance based on signals output from the position detection electrode 22. And then, the touch position detection portion 62 calculates a center position of an intensity distribution of the changed capacitance detected and determines the touch position of the detection target object F.

On the other hand, in the touch panel 100, when the input surface is depressed by the detection target object F, the distance d between the drive electrode 11 and the pressing force detection electrode 23 is reduced. Thus, the capacitance between the drive electrode 11 and the pressing force detection electrode 23 is increased. Then, the pressing force detection portion 61 detects the changes in the capacitance based on signals output from the pressing force detection electrode 23. And then, the pressing force detection portion can determine the pressing force exerted by the detection target object F on the touch panel 100 based on the changes in the capacitance detected.

Here, the touch panel 100 according to the modified example of the second embodiment has the configuration in which the floating island electrode 14 is formed in the region corresponding to the notch portion of the slit portion 112b of the drive electrode 11 located above the position detection electrode 22. Therefore, the position detection electrode 22 is capacitively coupled with the floating island electrode 14.

With the floating island electrode 14, the touch panel 100 according to the modified example of the second embodiment can prevent the arrangement pattern of the position detection electrode 22 and the pressing force detection electrode 23 in the sense electrode 21 from being visible through the notch portion of the slit portion 112b. Furthermore, in the case of detecting the touch positions of the detection target object F on the input surface, erroneous detection of pressing forces due to the direct capacitive coupling between the detection object F and the pressing force detection electrode 23 can be prevented.

Third Embodiment

Figure 15:
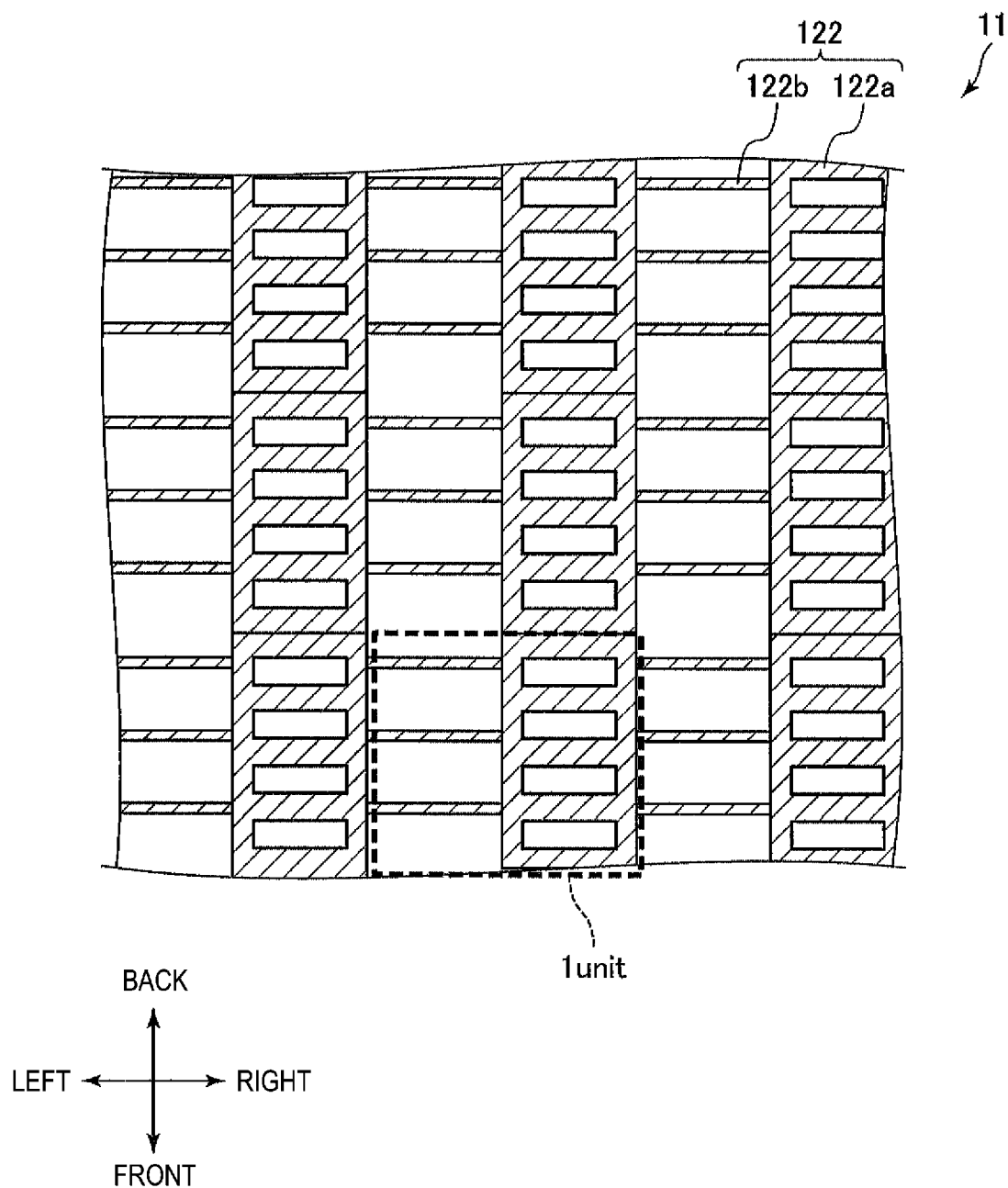
FIG. 15 is a plan view illustrating a configuration of a drive electrode included in a touch panel according to a third embodiment of the present disclosure.
Figure 16:
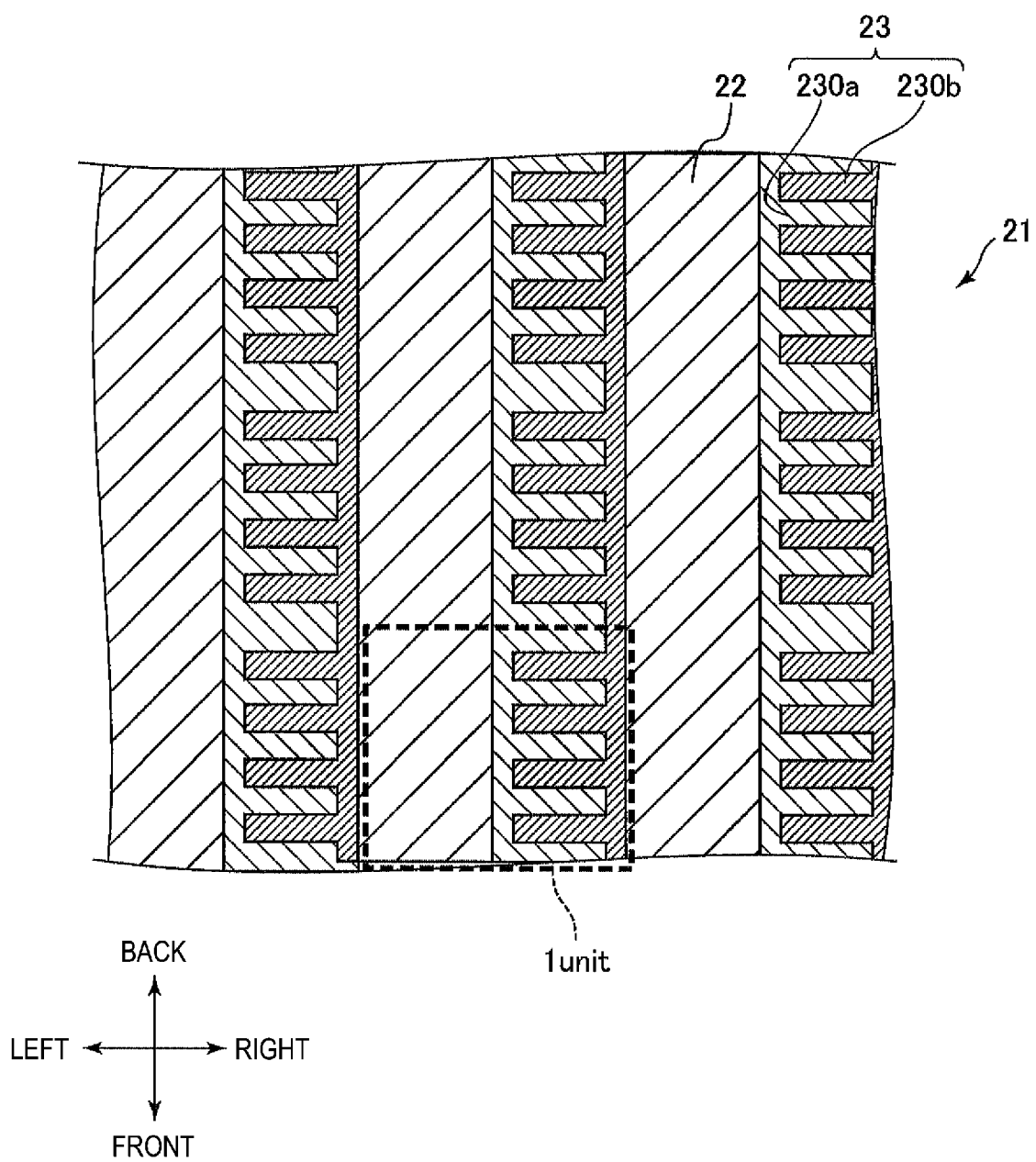
FIG. 16 is a plan view illustrating a configuration of a sense electrode included in a touch panel according to a third embodiment of the present disclosure.

Next, a configuration of a touch panel 200 according to a third embodiment will be described with reference to FIGS. 15 to 17. FIG. 15 is a plan view illustrating a configuration of the drive electrode 11 included in the touch panel 200 according to the third embodiment of the present disclosure. FIG. 16 is a plan view illustrating a configuration of the sense electrode 21 included in the touch panel 200 according to the third embodiment of the present disclosure.

While FIG. 15 illustrates a configuration of the drive electrode 11 disposed in a layer above another layer in which the sense electrode 21 is provided, FIG. 16 illustrates a configuration of the sense electrode 21 disposed in a layer below another layer in which the drive electrode 11 is provided. As described above, for the convenience of illustration, the drive electrode 11 and the sense electrode 21 included in the touch panel 200 are separately illustrated in FIG. 15 and FIG. 16. In FIG. 15 and FIG. 16, the right-left direction in the drawing corresponds to the horizontal direction, and the bottom-top direction in the drawing corresponds to the front-back direction.

Figure 17:
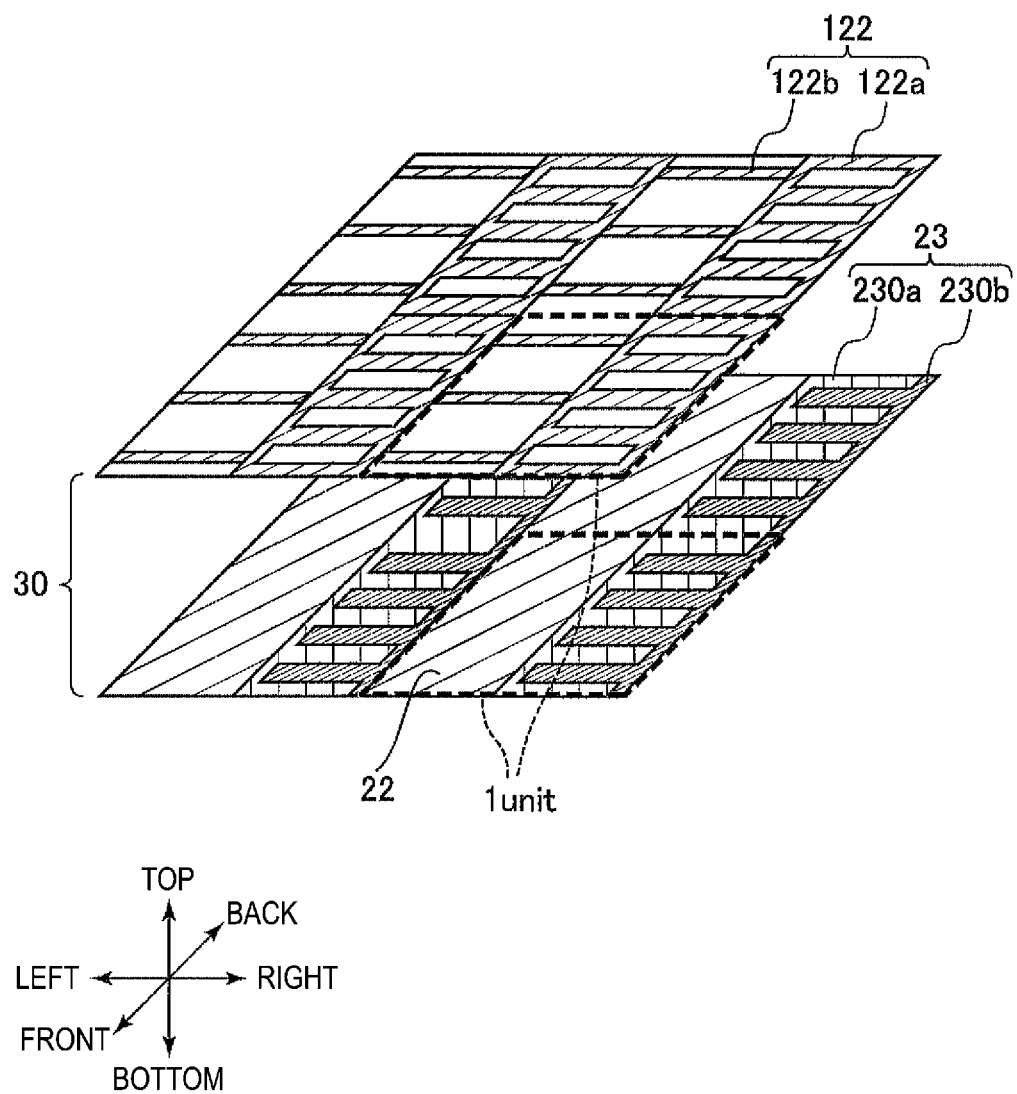
FIG. 17 is a perspective view schematically illustrating a positional relationship between a drive electrode and the sense electrode included in a touch panel according to a third embodiment of the present disclosure.

FIG. 17 is a perspective view schematically illustrating the positional relationship between the drive electrode 11 and the sense electrode 21 included in the touch panel 200 according to the third embodiment of the present disclosure. In FIG. 17, the top-bottom direction in the drawing corresponds to the vertical direction, the right-left direction in the drawing corresponds to the horizontal direction, and the direction orthogonal to each of the vertical direction and the horizontal direction corresponds to the front-back direction.

The touch panel 200 according to the third embodiment is similar to the touch panel 100 according to the first embodiment except for differences in configurations of the drive electrode 11 provided on the lower face 101 of the first substrate 10 and the sense electrode 21 provided on the upper face 201 of the second substrate 20. Thus, common structural elements are denoted by the same reference signs and descriptions of them are omitted.

In the touch panel 1 according to the first embodiment, the drive electrode 11 includes the plurality of the drive solid electrodes 12 made of a transparent conductive film such as ITO, and the plurality of the metal meshes 13. In contrast, in the touch panel 200 according to the third embodiment, the drive electrode 11 is composed of a drive solid electrode 122 made of a transparent conductive film such as ITO as illustrated in FIG. 15. In addition, unlike the drive solid electrode 12, the drive solid electrode 122 includes a ladder portion 122a (first electrode portion) having a ladder shape and a slit portion 122b (second electrode portion) in which a plurality of thin line portions are bridged between two ladder portions 122a disposed adjacent to each other. In the drive electrode 11 according to the third embodiment, the ladder portion 122a is disposed in a position corresponding to the position of the drive solid electrode 12 included in the drive electrode 11 according to the first embodiment, and the slit portion 122b is disposed in a position corresponding to the position of the mesh region 13a. Note that an area of a space formed in the ladder portion 122a per unit surface area is smaller than an area of a space formed in the slit portion 122b per unit area.

In the touch panel 1 according to the first embodiment, the sense electrode 21 includes the plurality of the position detection electrodes 22 and the plurality of the pressing force detection electrodes 23 both having a rectangular flat plate shape extending in the front-back direction. In contrast, in the touch panel 200 according to the third embodiment, the sense electrode 21 has a different configuration of the pressing force detection electrode 23.

Specifically, as illustrated in FIG. 16 and FIG. 17, the pressing force detection electrode 23 includes a pressing force detection electrode portion 230a having a comb outer shape in a planar view and extending in the front-back direction, and a shield portion 230b having a comb outer shape in a planar view and extending in the front-back direction. In a planar view, the pressing force detection electrode portion 230a overlaps the ladder portion 122a of the drive solid electrode 122 and is covered by the ladder portion 122a. Thus, as in the case of the touch panel 1 according to the first embodiment, the touch panel 200 according to the third embodiment can detect pressing forces with the pressing force detection electrode 23 with high accuracy.

Furthermore, the pressing force detection electrode portion 230a and the shield portion 230b are disposed in such a manner that their concave portions and protruding portions mate with each other. Here, the shield portion 230b is grounded and prevents erroneous detection of pressing forces by the pressing force detection electrode portion 230a. Specifically, the shield portion 230b prevents the changes in the capacitance between the drive electrode 11 and the pressing force detection electrode portion 230a due to the capacitive coupling of the detection target object F with each of the drive electrode 11 and the pressing force detection electrode portion 230a of the pressing force detection electrode 23 even though the detection target object F is not pressed against the input surface of the touch panel 200. Thus, the touch panel 200 according to the third embodiment can detect the magnitude of pressing forces with higher accuracy.

In the operation to detect the tilt of the stylus 50, the shield portion 230b is configured to function as a sense electrode in the same manner as the pressing force detection electrode portion 230a. Thus, when the stylus 50 is above the shield portion 230b, the shield portion 230b can receive signals output from the stylus 50.

Figure 18:
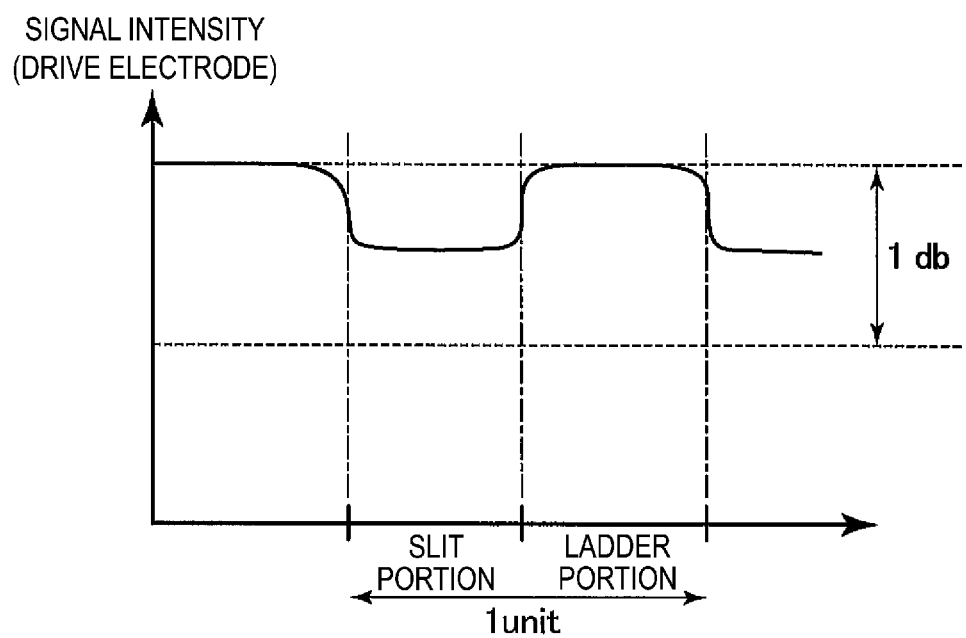
FIG. 18 is a graph showing the changes in the intensity of signals received by a drive electrode when a stylus moves in a drive electrode direction in a touch panel according to a third embodiment of the present disclosure.
Figure 19:
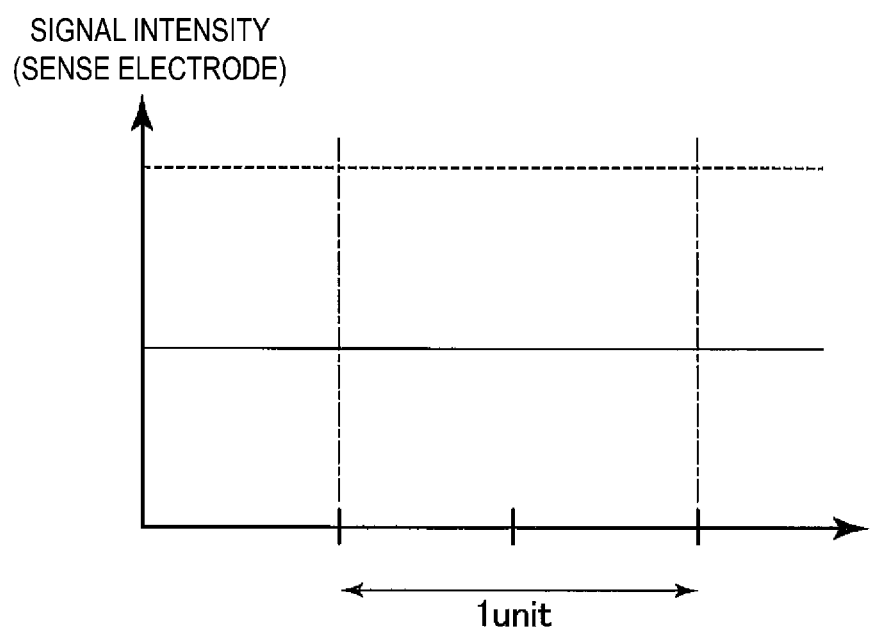
FIG. 19 is a graph showing the changes in the intensity of the signals received by a sense electrode when a stylus moves in a sense electrode direction in a touch panel according to a third embodiment of the present disclosure.

Then, in the touch panel 200 according to the third embodiment, the operation to detect the tile of the stylus 50 was examined in the same manner as in the touch panel 1 according to the first embodiment and the touch panel 100 according to the second embodiment, and the results are as shown in FIG. 18 and FIG. 19. FIG. 18 is a graph showing the changes in the intensity of the signals received by the drive electrode 11 when the stylus 50 moves in the drive electrode direction in the touch panel 200 according to the third embodiment of the present disclosure. FIG. 19 is a graph showing the changes in the intensity of the signals received by the sense electrode 21 when the stylus 50 moves in the sense electrode direction in the touch panel 200 according to the third embodiment of the present disclosure.

FIG. 18 shows the changes in the intensity of the signals received by the drive electrode 11 when the stylus 50 moves in the drive electrode direction over a range of the input surface corresponding to the one unit of the drive electrode 11. FIG. 19 shows the changes in the intensity of the signals received by the sense electrode 21 when the stylus 50 moves in the sense electrode direction over a range of the input surface corresponding to the one unit of the sense electrode 21.

Here, the drive solid electrode 122 has a configuration in which the ladder portion 122a and the slit portion 122b are alternately disposed in the drive electrode direction. Thus, in the case where the stylus 50 moves in the drive electrode direction, the intensity of the signals received by the drive electrode 11 differs between when the stylus 50 is above the ladder portion 122a and when the stylus 50 is above the slit portion 122b as shown in FIG. 18. That is, the ladder portion 122a is larger than the slit portion 122b in area per unit surface area in the drive electrode 11. Thus, the signals received by the ladder portion 122a and the signals received by the slit portion 122b have different intensities.

Specifically, in the case where the stylus 50 moves in the drive electrode direction, the intensity of the signals received by the drive electrode 11 is lower when the stylus 50 is moving above the slit portion 122b than when the stylus 50 is moving above the ladder portion 122a. Thus, in the case where the stylus 50 moves in the drive electrode direction, the intensity distribution of the signals received by the drive electrode 11 includes peaks (maximum values) and valleys (minimum values). However, a difference between a maximum value and a minimum value of the intensity of the signals can be controlled to 1 dB or less. Thus, the intensity of the signals received by the drive electrode 11 can be said to be substantially constant without dependence on the positions of the stylus 50 as long as the posture of the stylus 50 is not changed. In particular, the difference between a maximum value and a minimum value can be further reduced by reducing the difference in area per unit surface area between the ladder portion 122a and the slit portion 122b.

On the other hand, the sense electrode 21 includes the position detection electrode 22 and the pressing force detection electrode 23 both having a rectangular outer shape in a planar view. The pressing force detection electrode 23 includes the shield portion 230b having a comb outer shape in a planar view, and the pressing force detection electrode portion 230a having a comb outer shape in a planar view and mated with the shield portion 230b.

Here, when the stylus 50 moves above the position detection electrode 22 in the sense electrode direction, the area of the position detection electrode 22 is constant, and thus the intensity of the signals received by the position detection electrode 22 is constant as illustrated in FIG. 19. On the other hand, in the case where the stylus 50 moves above the pressing force detection electrode 23 in the sense electrode direction, the area of the pressing force detection electrode portion 230a varies depending on locations because the pressing force detection electrode portion 230a has a comb outer shape in a planar view. However, in the case of detecting the tilt of the stylus 50, the shield portion 230b mated with the pressing force detection electrode portion 230a also functions as a sense electrode. Thus, the pressing force detection electrode 23, as a whole, has a rectangular outer shape in a planar view similar to the position detection electrode 22. Therefore, when the stylus 50 moves above the pressing force detection electrode 23 in the sense electrode direction, the area of the pressing force detection electrode 23 is constant, and thus the intensity of the signals received by the pressing force detection electrode 23 is constant as illustrated in FIG. 19.

Touch Panel with Display Device

Figure 20:
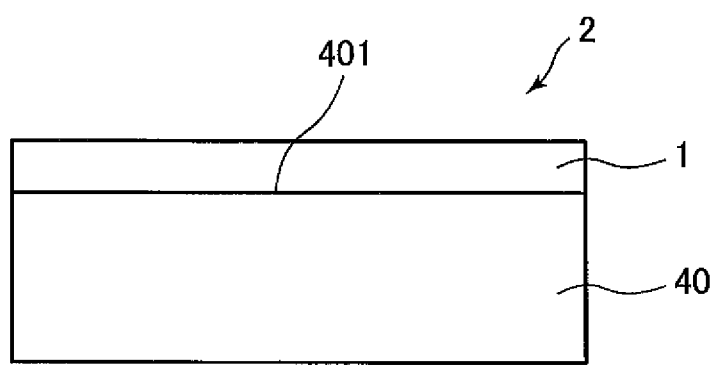
FIG. 20 is a cross-sectional view illustrating a configuration of a display device provided with a touch panel according to a first embodiment of the present disclosure.

The touch panels 1, 100, and 200 according to the first, second, and third embodiments described above can be mounted on a display device, for example. FIG. 20 is a cross-sectional view illustrating a configuration of a display device 2 provided with the touch panel 1 according to the first embodiment of the present disclosure. Note that, while FIG. 20 illustrates an example of the display device 2 provided with the touch panel 1 according to the first embodiment, the touch panel 100 according to the second embodiment and the touch panel 200 according to the third embodiment can similarly be mounted on the display device 2.

As illustrated in FIG. 20, the display device 2 includes the touch panel 1 and a display portion 40 configured to display images on a display surface 401. The display unit 40 may be configured by a liquid crystal display or an organic Electro Luminescence (EL) display, for example. The touch panel 1 is disposed on the display surface 401 of the display unit 40 such that the second substrate 20 is adjacent to the display unit 40. When the touch panel 1 is mounted on the display device 2 in this manner, the controller 60 may be implemented by a controller (not illustrated) included in the display device 2. Examples of the display device 2 described above may include a display device supporting a touch interface provided in a laptop PC, a tablet PC, and the like.

While there have been described what are at present considered to be certain embodiments of the application, it will be understood that various modifications may be made thereto, and it is intended that the appended claim cover all such modifications as fall within the true spirit and scope of the application.

What is claimed is:

1. A touch panel comprising:
   a sense electrode including a first sense electrode and a second sense electrode, the sense electrode having a rectangular outer shape extending in a first direction; and
   a drive electrode including a first drive electrode having a shielding property against electric field components, the drive electrode having a rectangular outer shape extending in a second direction intersecting with the first direction on the sense electrode,
   the first drive electrode being a solid electrode and positioned covering at least a part of the first sense electrode in a planar view in which the sense electrode is viewed from the drive electrode and being capacitively coupled with the first sense electrode and the second sense electrode when one kind of drive signal is applied from outside, wherein
   the drive electrode further including a second drive electrode having a rectangular outer shape and being disposed in a position opposite to the first sense electrode and the second sense electrode,
   the second drive electrode being a metal mesh electrode formed by wiring thin metal wires, and
   the first drive electrode being layered on the second drive electrode.

2. The touch panel according to claim 1,
   wherein
   the first drive electrode is an electrode having a rectangular flat plate outer shape and including a transparent conductive film, and
   the second drive electrode is an electrode including a transparent conductive film in which slits are formed.

3. The touch panel according to claim 1, further comprising a shield electrode provided along an outer circumference of the first sense electrode and having an electrical potential independent of the first sense electrode.

4. The touch panel according to claim 1,
   wherein the first drive electrode is disposed covering an entirety of the first sense electrode in the planar view.

5. A display device comprising:
   the touch panel according to claim 1; and
   a display portion having a display surface configured to display images, the touch panel being disposed on the display surface.

6. An input device comprising:
   the touch panel according to claim 1; and
   a controller,
   the controller being configured to:
      obtain an intensity of a signal generated from a detection target object and received with the sense electrode or the drive electrode; and
      determine that, when the intensity of the signal falls within a certain range, a tilt of the detection target object has not been changed with respect to an input surface of the touch panel.

7. A touch panel comprising:
   a sense electrode including a first sense electrode and a second sense electrode, the sense electrode having a rectangular outer shape extending in a first direction; and
   a drive electrode including a first drive electrode having a shielding property against electric field components, the drive electrode having a rectangular outer shape extending in a second direction intersecting with the first direction on the sense electrode,
   the first drive electrode being positioned covering at least a part of the first sense electrode in a planar view in which the sense electrode is viewed from the drive electrode,
   the first sense electrode including:
   a pressing force detection electrode portion having a comb outer shape in the planar view; and
   a shield portion having an electrical potential independent of the pressing force detection electrode portion and being disposed mated with the pressing force detection electrode portion in the planar view, and
   the first drive electrode being positioned to cover an entirety of the pressing force detection electrode portion in the planar view.

8. A touch panel comprising:
   a sense electrode including a first sense electrode and a second sense electrode, the sense electrode having a rectangular outer shape extending in a first direction; and
   a drive electrode including a first drive electrode having a shielding property against electric field components, the drive electrode having a rectangular outer shape extending in a second direction intersecting with the first direction on the sense electrode,
   the first drive electrode being a solid electrode and positioned to cover at least a part of the first sense electrode in a planar view in which the sense electrode is viewed from the drive electrode,
   the drive electrode further including a second drive electrode having a rectangular outer shape and being disposed in a position opposite to the first sense electrode and the second sense electrode,
   the second drive electrode being a metal mesh electrode formed by wiring thin metal wires, and the first drive electrode being layered on the second drive electrode.

\* \* \* \* \*